United States Patent
Baik et al.

(10) Patent No.: US 7,420,755 B2
(45) Date of Patent: Sep. 2, 2008

(54) LENS DRIVING DEVICE

(75) Inventors: Jae Ho Baik, Busan (KR); Ho Seop Jeong, Kyungki-do (KR); Cheong Hee Lee, Kyungki-do (KR)

(73) Assignee: Samsung Electro-Mechanics Co., Ltd., Suwon, Kyungki-do (KR)

( * ) Notice: Subject to any disclaimer, the term of this patent is extended or adjusted under 35 U.S.C. 154(b) by 428 days.

(21) Appl. No.: 11/331,176

(22) Filed: Jan. 13, 2006

(65) Prior Publication Data

US 2006/0209434 A1 Sep. 21, 2006

(30) Foreign Application Priority Data

Mar. 16, 2005 (KR) .................. 10-2005-0021768

(51) Int. Cl.
*G02B 7/02* (2006.01)
(52) U.S. Cl. .................. 359/819; 359/823; 359/824; 359/811
(58) Field of Classification Search .................. 359/819, 359/820, 822, 823, 824, 811, 813, 821
See application file for complete search history.

(56) References Cited

FOREIGN PATENT DOCUMENTS

| JP | 09-49958 | 2/1997 |
|---|---|---|
| JP | 09-329736 | 12/1997 |

OTHER PUBLICATIONS

Korean Intellectual Property Office, Office Action, mailed Jun. 9, 2006.

*Primary Examiner*—David N. Spector
*Assistant Examiner*—Brandi N Thomas
(74) *Attorney, Agent, or Firm*—Lowe Hauptman Ham & Berner

(57) ABSTRACT

The invention provides a lens driving device capable of performing zooming and auto-focusing using a single actuator, with a simple and miniaturized structure and less power consumption. The lens driving device includes a first lens disposed movable during zooming and automatic focusing, a second lens disposed movable during zooming independently from the first lens. The lens driving device also includes a lens movement guide member, having a first guide part, and a second guide part, rotated to move the first and second lenses. An actuator is provided to move the first and second lenses, and both the first and second lenses are moved during zooming while only the first lens is finely moved during automatic focusing.

10 Claims, 20 Drawing Sheets

(a)

(b)

LENS DRIVING DEVICE

CLAIM OF PRIORITY

This application claims the benefit of Korean Patent Application No. 2005-21768 filed on Mar. 16, 2005, in the Korean Intellectual Property Office, the disclosure of which is incorporated herein by reference.

BACKGROUND OF THE INVENTION

1. Field of the Invention

The present invention relates to a lens driving device, and more particularly, to a lens driving device capable of performing zooming and automatic focusing using a single actuator.

2. Description of the Related Art

Optical devices such as cameras, camcorders, compact zoom cameras, security cameras, and micro-aircrafts have a structure for moving lenses to perform optical zooming.

In order to perform zooming, diverse structures for moving lenses have been developed, which usually adopt a cam driving mechanism. This cam driving mechanism includes a lens barrel rotated by an actuator such as an electromagnetic motor, and each lens is moved along a cam-shape slot on an outer circumference of the lens barrel so that the relative distance of the lenses is changed to perform zooming.

On the other hand, in the small camera modules for mobile communication terminals or Personal Digital Assistants (PDAs), zooming is performed only at predetermined zoom ratios.

FIGS. 1 and 2 illustrate a zooming method in which lenses are arranged at predetermined positions to perform zooming. In order to perform zooming as illustrated in FIGS. 1a and 2a, the relative distance of two lenses ML1 and ML2 is changed in general, and also additional fixed lenses FL1 and FL2 may be provided to enhance optical capability.

At this time, in order to perform zooming, the movable lenses ML1 and ML2 are moved from the initial positions P1 and P4 to the zoom positions corresponding to the set zoom ratios. For example, they are moved to P3 and P6 with a zoom ratio of 2 as shown in FIG. 1b, or to P2 and P5 with a zoom ratio of 2 and to P3 and P6 with a zoom ratio of 3. In order for such movement of the lenses, a guide slot as shown in FIGS. 1b and 2b is provided on an outer circumference of the lens barrel, which is rotated to move the lenses along the guide slot.

As described above, the movable lenses ML1 and ML2 are moved to the zoom positions corresponding to the predetermined zoom ratios, and then the relative distance between the movable lenses ML1 and ML2 is changed to perform zooming.

However, if only zooming is performed as described above, the focus distance of the object is not adjusted, and thus the optical characteristics are degraded, hindering achievement of high definition and high picture quality.

To solve such a problem, zooming and auto focusing is required, which requires so many mechanical apparatuses and control circuits, complicating the structure.

Especially, in order to perform optical zooming and auto focusing, two drivers are needed, which in turn, increases volume, weight and power consumption, making it difficult to apply to small camera modules required for mobile communication terminals or PDAs.

SUMMARY OF THE INVENTION

The present invention has been made to solve the foregoing problems of the prior art and it is therefore an object of the present invention to provide a lens driving device for performing zooming and auto-focusing through a single actuator.

It is another object of the present invention to provide a lens driving device which is miniaturized, light weight, and simple in structure with lower manufacturing costs and consumption of power.

According to an aspect for realizing the object of the invention, the present invention provides a lens driving device for moving lenses to perform zooming and automatic focusing including: a first lens disposed movable during zooming and automatic focusing; a second lens disposed movable during zooming independently from the first lens; a lens movement guide member having a first guide part for guiding the movement of the first lens so that the first lens is moved during zooming and finely moved from a zoom position with respect to the second lens during automatic focusing, and a second guide part for guiding the movement of the second lens so that the second lens is moved during zooming and remains stationary on an optical axis during automatic focusing, wherein the lens movement guide member is rotated to move the first and second lenses; and an actuator providing driving power necessary to move the first and second lenses during zooming and automatic focusing; whereby both the first and second lenses are moved during zooming and subsequently, only the first lens is finely moved during automatic focusing so that zooming and automatic focusing is performed by the single actuator.

Preferably, the first guide part is configured to guide the movement of the first lens so that the first lens is moved to each of zoom positions corresponding to at least two predetermined zoom ratios during zooming, and is finely moved from each of the zoom positions during automatic focusing, and the second guide parts is configured to guide the movement of the second lens so that the second lens is moved to predetermined zoom positions during zooming, and remains stationary in each of the zoom positions during automatic focusing.

At this time, the second guide part includes a guide slope for guiding the movement of the second lens to each of the zoom positions, and a movement restraint formed on a plane perpendicular to the rotational axis of the movement guide member to restrain the movement of the second lens from each of the zoom positions during automatic focusing.

The lens driving device of the present invention may further include an optical axis guide part for guiding the movement of the first and second lenses so that the first and second lenses are moved along the optical axis.

In addition, the lens driving device may further include a first lens holder having the first lens installed therein, and a second lens holder having the second lens installed therein, wherein the movement of the first lens holder and the second lens holder is guided by the lens movement guide member.

According to another aspect for realizing the object, the present invention provides a lens driving device for moving lenses to perform zooming and automatic focusing including: a first lens moved during zooming and automatic focusing; a second lens moved independently from the first lens during zooming; a lens movement guide member having a first guide part for guiding the movement of the first lens so that the first lens is moved to each of zoom positions during zooming and finely moved from each of the zoom positions with respect to the second lens during automatic focusing, and a second guide part for guiding the movement of the second lens so that the second lens is moved to each of the zoom positions during zooming and remains stationary during automatic focusing, wherein the lens movement guide member is rotated to move the first and second lenses; and an actuator providing driving power necessary to move the first and second lenses during zooming and automatic focusing, whereby both the first and second lenses are moved during zooming, and subsequently, only the first lens is finely moved during automatic focusing so that automatic focusing is performed by the single actuator.

Preferably, the movement guide member comprises a lens barrel rotated by the actuator, the first guide part and the second guide part each comprise a guide slot perforated on an outer circumference of the lens barrel, and the first and second lenses are moved along the guide slot.

More preferably, the second guide part includes a guide slope for guiding the movement of the second lens to each of the zoom positions, and a movement restraint formed on a plane perpendicular to a rotational axis of the movement guide member to restrain the movement of the second lens from each of the zoom positions during automatic focusing.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b illustrate the positions of lenses with a zoom ratio of 2 during zooming by a conventional lens driving device, in which FIG. 1a is a block diagram illustrating the relative positions of the lenses, and FIG. 1b is a graph illustrating the positions of the lenses according to different zoom ratios;

FIGS. 2a and 2b illustrate positions of lenses with a zoom ratio of 3 during zooming by a conventional lens driving device, in which FIG. 2a is a block diagram illustrating the relative positions of the lenses, and FIG. 2b is a graph illustrating the positions of the lenses according to different zoom ratios;

FIGS. 5a to 5e illustrate the lens driving device according to the present invention in which FIG. 5a is an overall perspective view, FIG. 5b is a perspective view of a lens barrel with lens holders installed therein, FIG. 5c is a perspective view illustrating the connection between the lens holders and an optical axis guide part, FIG. 5d is a perspective view of the lens barrel, and FIG. 5e is an unfolded view of the lens barrel;

FIGS. 6a to 6d illustrates a lens driving device having a lead screw according to the present invention, in which FIG. 6a is an overall perspective view of two lead screws connected to each other, FIG. 6b is an overall perspective view of two lead screws disposed separately from each other, FIG. 6c is a front elevational view of two lead screws connected to each other, and FIG. 6d is a front elevational view of two lead screws disposed separately from each other;

FIGS. 7a and 7b is a block diagram of the lens arrangement in a zoom lens system with a lens driving device according to the present invention, in which FIG. 7a is a block diagram of lens arrangement from a wide angle end, and FIG. 7b is a block diagram of lens arrangement from a telephoto end;

FIGS. 8a to 8c are graphs showing aberrations at a wide angle end, focused at an object distance of 777 mm in the zoom lens system as shown in FIG. 7, in which FIGS. 8a, 8b, and 8c represent a spherical aberration, astigmatism, and distortion, respectively;

FIGS. 9a to 9c are graphs showing aberrations at a telephoto end, with the lenses focused at an object distance of 777 mm in the zoom lens system as shown in FIG. 7, in which FIGS. 9a, 9b, and 9c represent a spherical aberration, astigmatism, and distortion , respectively;

FIGS. 10a to 10c are graphs showing aberrations at a wide angle end, with the lenses focused at an object distance of 400 mm in the zoom lens system as shown in FIG. 7, in which FIGS. 10a, 10b, and 10c represent a spherical aberration, astigmatism, and distortion, respectively;

FIGS. 11a to 11c are graphs showing aberrations at a telephoto end, with the lenses focused at an object distance of 400 mm in a zoom lens system, in which FIGS. 11a, 11b, and 11c represent a spherical aberration, astigmatism, and distortion, respectively;

FIGS. 12a and 12b illustrate the Modulation Transfer Function (MTF) characteristics, with the lenses focused at an object distance of 400 mm in the zoom lens system as shown in FIG. 7, in which FIGS. 12a and 12b represent the MTF curves from a wide angle end and a telephoto end, respectively;

FIGS. 13a to 13c illustrate aberrations at a wide angle end in the zoom lens system shown in FIG. 7 when the lenses focused at an object distance of 777 mm are moved to the distance of 400 mm, in which FIGS. 13a, 13b, and 13c represent a spherical aberration, astigmatism, and distortion, respectively;

FIGS. 14a to 14c illustrate aberrations at a telephoto end in the zoom lens system shown in FIG. 7 when the lenses focused at an object distance of 777 mm are moved to the distance of 400 mm, in which FIGS. 14a, 14b, and 14c represent a spherical aberration, astigmatism, and distortion, respectively; and FIGS. 15a and 15b illustrate the MTF characteristics, in the zoom lens system shown in FIG. 7 when the lenses focused at an object distance of 777 mm are moved to the distance of 400 mm, in which FIGS. 15a and 15b represent the MTF curves at a wide angle end and a telephoto end, respectively.

DETAILED DESCRIPTION OF THE PREFERRED EMBODIMENT

Preferred embodiments of the present invention will now be described in detail with reference to the accompanying drawings.

Figure 1:
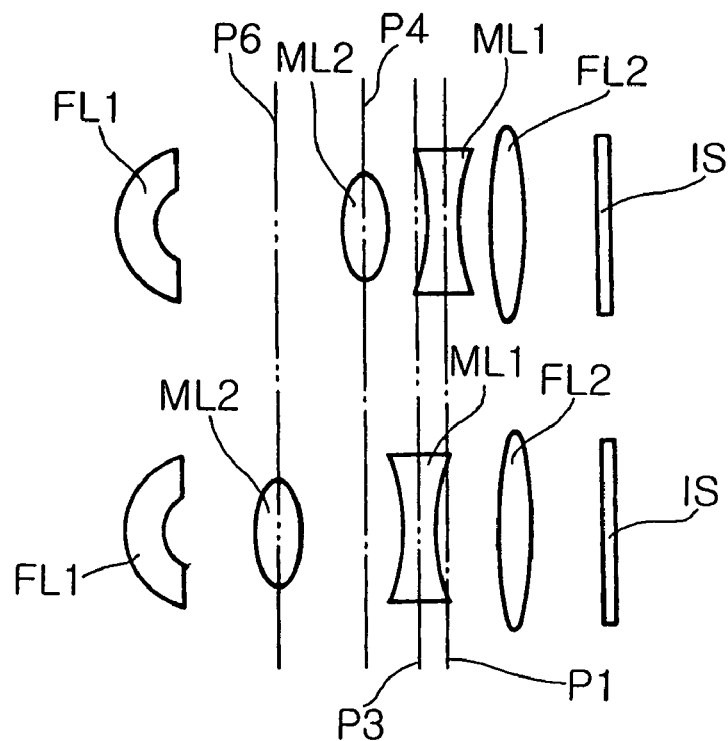
Figure 1:
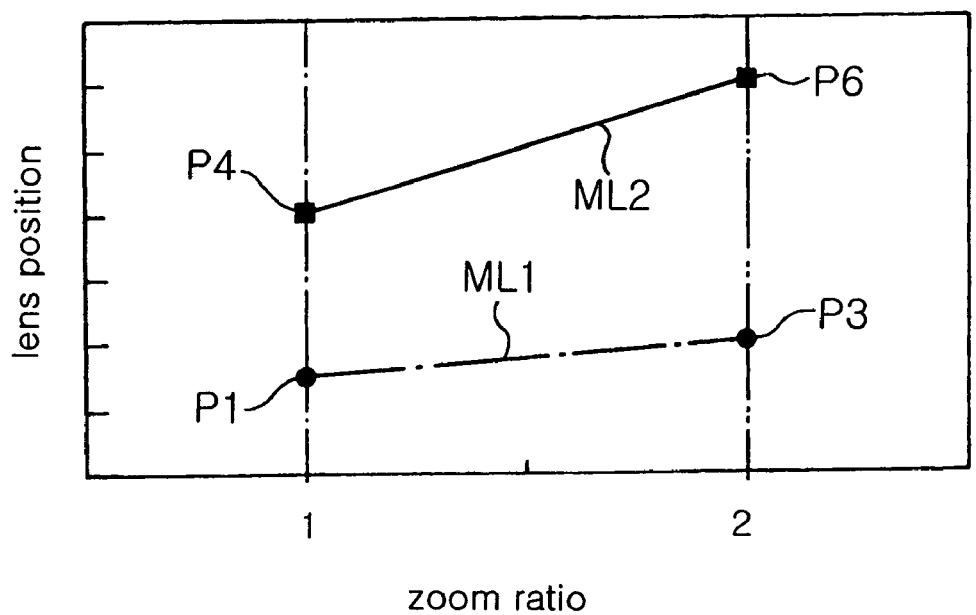
Figure 2:
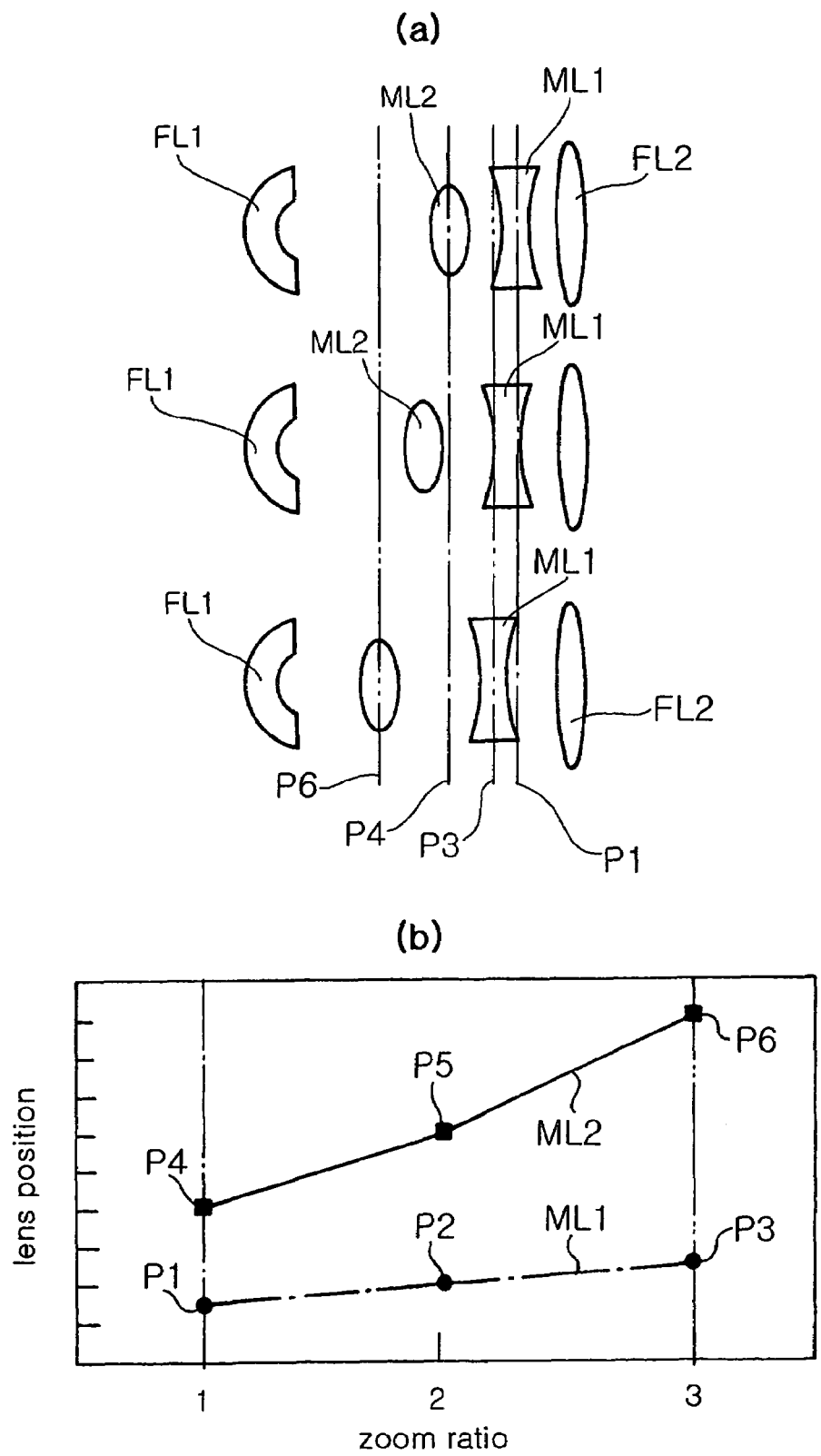
Figure 3:
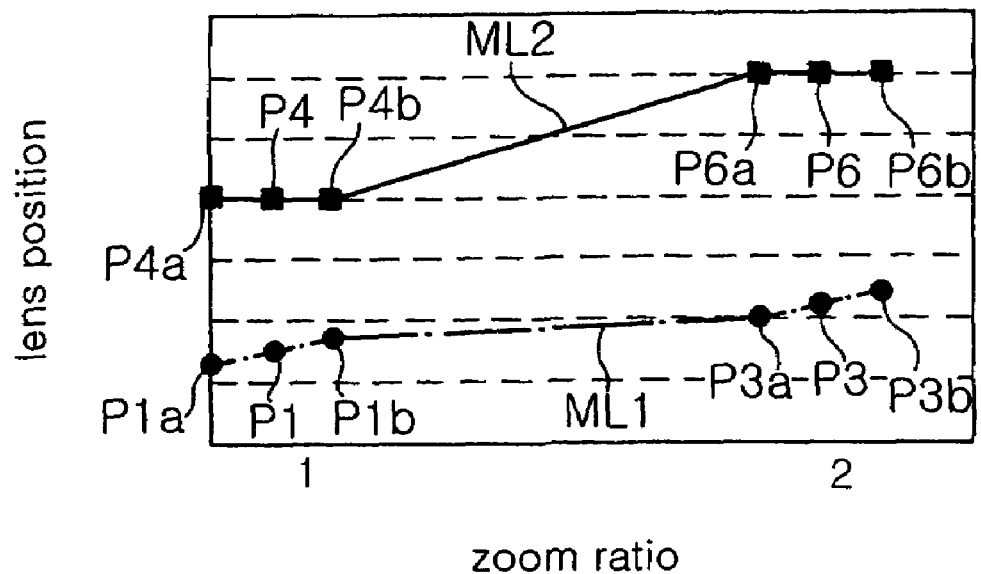
FIG. 3 is a graph illustrating the positions of lenses during zooming by a lens driving device according to the present invention, with a zoom ratio of 2.
Figure 4:
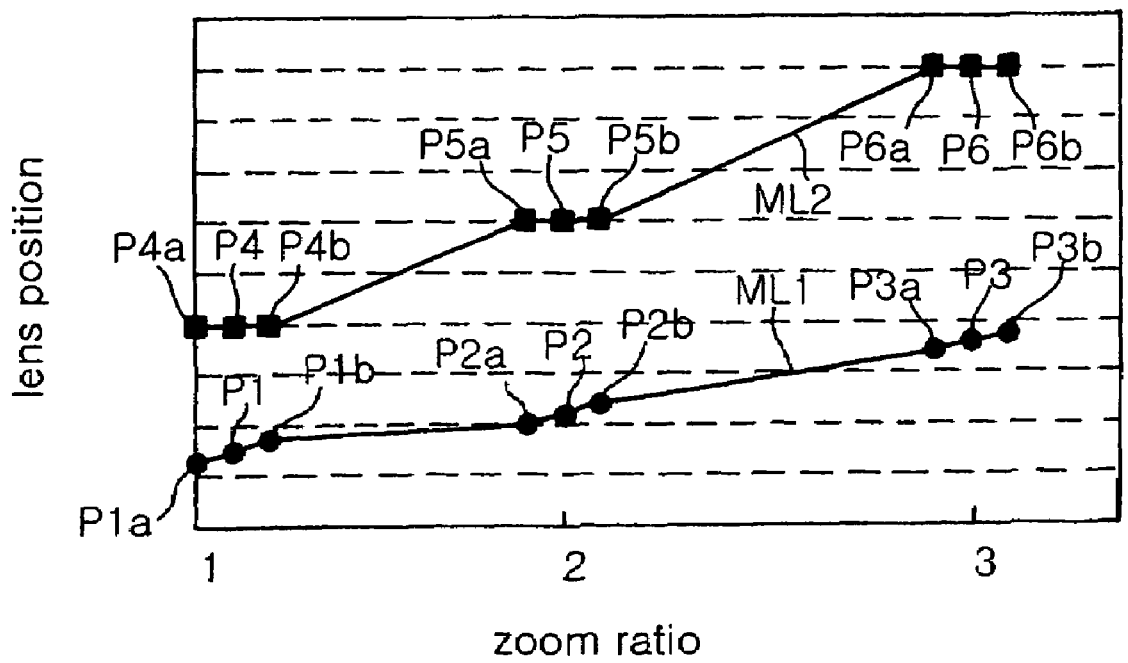
FIG. 4 is a graph illustrating the positions of lenses with a zoom ratio of 3 during zooming by the lens driving device according to the present invention.

FIGS. 3 and 4 are graphs illustrating the positions of lens during zooming by a lens driving device according to the present invention, with zoom ratios of 2 and 3, respectively.

FIGS. 5a to 5e are perspective views illustrating lens driving devices having lens barrels according to the present invention, and FIGS. 6a to 6d illustrate lens driving devices having lead screws according to the present invention.

As shown in FIGS. 5a to 6d, the lens driving device 500 includes a first lens ML1 disposed movable during zooming and auto-focusing; a second lens ML2 disposed movable during zooming, independently from the first lens; a lens movement guide member 100 and 400 rotated to move the first and second lenses; and an actuator 200 for rotating the lens movement guide member 100 and 400, and for providing driving power needed for moving the first and second lenses during zooming and auto-focusing, wherein the zooming and auto-focusing is performed by the driving of the single actuator 200. That is, the lens movement guide member 100 and 400 moves the first lens ML1 and the second lens ML2 during zooming, and subsequently during auto-focusing, maintains the second lens stationary on an optical axis while finely moving the first lens ML1, thereby zooming and auto-focusing is performed by the single actuator 200.

Here, the first lens ML1 and the second lens ML2 refer to the lenses moved during zooming among the lenses provided in the zoom lens system, and they are moved along different paths according to the driving of the actuator 200 and the rotation movement of the lens movement guide member 100 and 400. That is, the movement of the second lens ML2 is independent from that of the first lens ML1. The zoom lens system using the lens driving device according to the present invention may be provided with a plurality of lenses composing the first lens ML1 and the second lens ML2, respectively, and also provided with a plurality of lenses which remain stationary during zooming or auto-focusing.

As shown in FIGS. 5a to 6d, the lens movement guide member 100 and 400 includes a first guide part 110 and 410 and a second guide part 120 and 420 for guiding the movement of the first lens ML1 and the second lens ML2, respectively, and is rotated by the driving power from the actuator 200 to move the first lens ML1 and the second lens ML2.

At this time, the first guide part 110 and 410 guides the movement of the first lens according to the lens movement guide member 100 and 400 so that the first lens is moved along a set path during zooming, and is finely moved during auto-focusing with respect to the second lens ML2.

In addition, the second guide part 120 and 420 guides the movement of the second lens according the rotation movement of the lens movement guide member 100 and 400 so that the second lens ML2 is moved along the set path during zooming and remains stationary on the optical axis during auto-focusing.

In order to guide the movement of the first lens ML1 and the second lens ML2, the guide parts 110, 120, 410 and 420 formed to guide the first lens ML1 and the second lens ML2 along the paths shown in FIG. 3 or 4.

That is, as shown in FIG. 3, the first guide part 110 and 410 is formed to guide the movement of the first lens ML1 from P1 to P3 (or the opposite), and the second guide part 120 and 420 is formed to guide the movement of the second lens ML2 from P4 to P6 (or the opposite). In addition, during the auto-focusing subsequent to the zooming, the guide part guides the second lens ML2 so that it is positioned between P6a and P6b and remains stationary on the optical axis and it is moved finely between P3a and P3b to perform auto-focusing.

That is, the second lens ML2 remains in a set position on the optical axis, and the first lens ML1 is finely moved with respect to the stationary second lens ML2 to perform auto-focusing. The first guide part 110 and 410 and the second guide part 120 and 420 are formed to have the paths as shown in FIG. 3 as an example, and thereby, the lens movement guide member 100 and 400 are rotated to perform zooming and auto-focusing by the single actuator.

In order to move the first lens ML1 and the second lens ML2 along the paths as shown in FIG. 3 or 4, guide slots as shown in the unfolded view of FIG. 5e, which will be explained hereunder, may be formed on the outer circumference of the lens barrel to allow linear movement along the paths shown in FIG. 3 or 4 as the lens barrel is rotated. Alternatively, as shown in FIG. 6c, there may be screw threads formed to allow linear movement along the paths as shown in FIG. 3 or 4 as lead screws are rotated.

The fine movement of the first lens ML1 may be achieved by reducing the rotation amount of the lens movement guide member 100 and 400 driven by the actuator 200, or by making the slopes formed between P1a and P1b, or P3a and P3b more gradual.

Such paths of the lenses may be formed in diverse ways depending on designing options. For example, the movement path of the lenses in FIGS. 3 and 4 may be changed according to the positions of the lenses moved according to different zooming methods such as inner zoom, rear zoom and front zoom, and are also variable depending on predetermined zoom ratios and positions. Also, the movement path of the lenses may be altered according to refractive power of the lenses. For example, the lenses may be moved during zooming in the direction in which the relative distance between the first lens and the second lens is decreased.

Figure 5A:
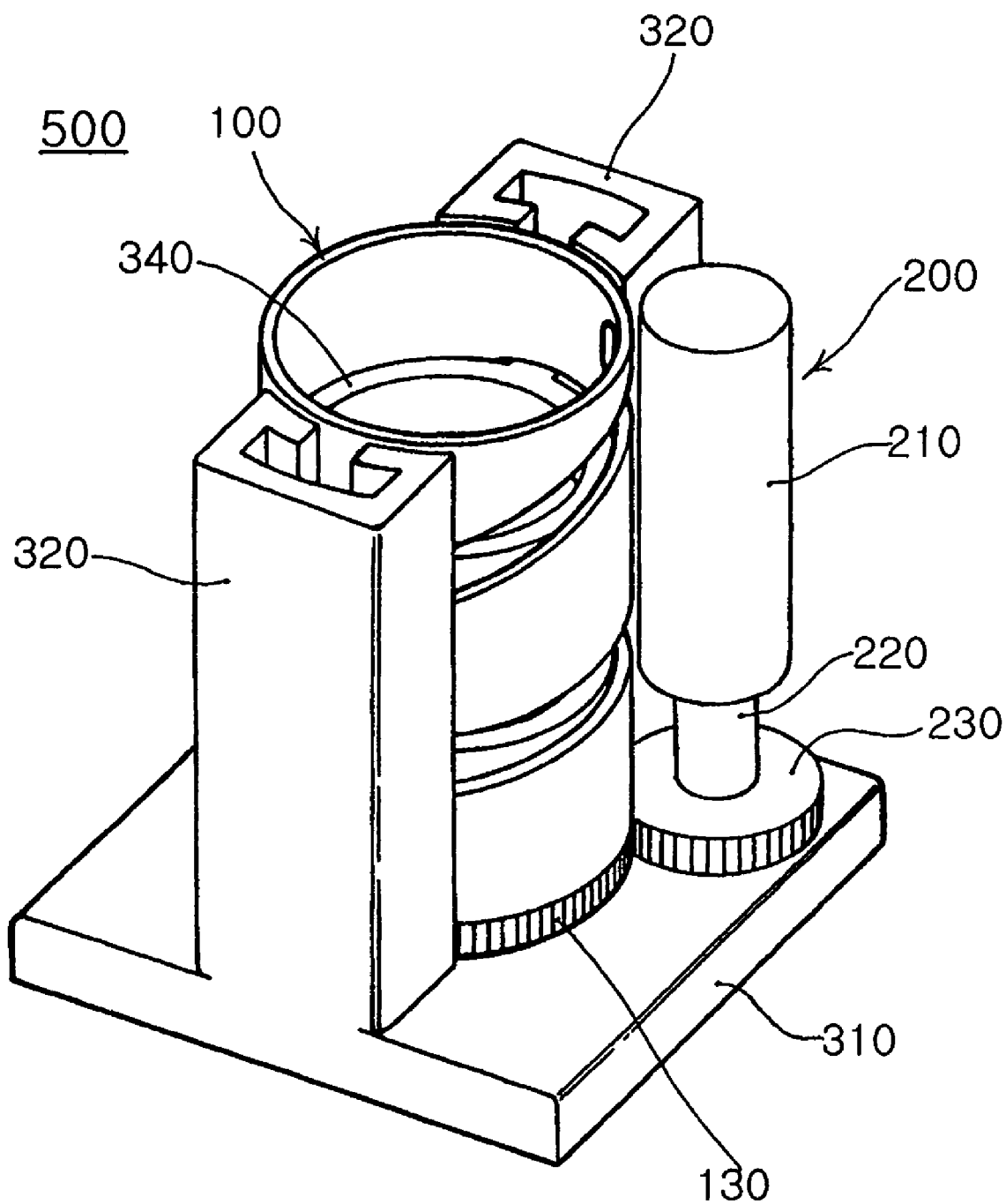
Figure 5B:
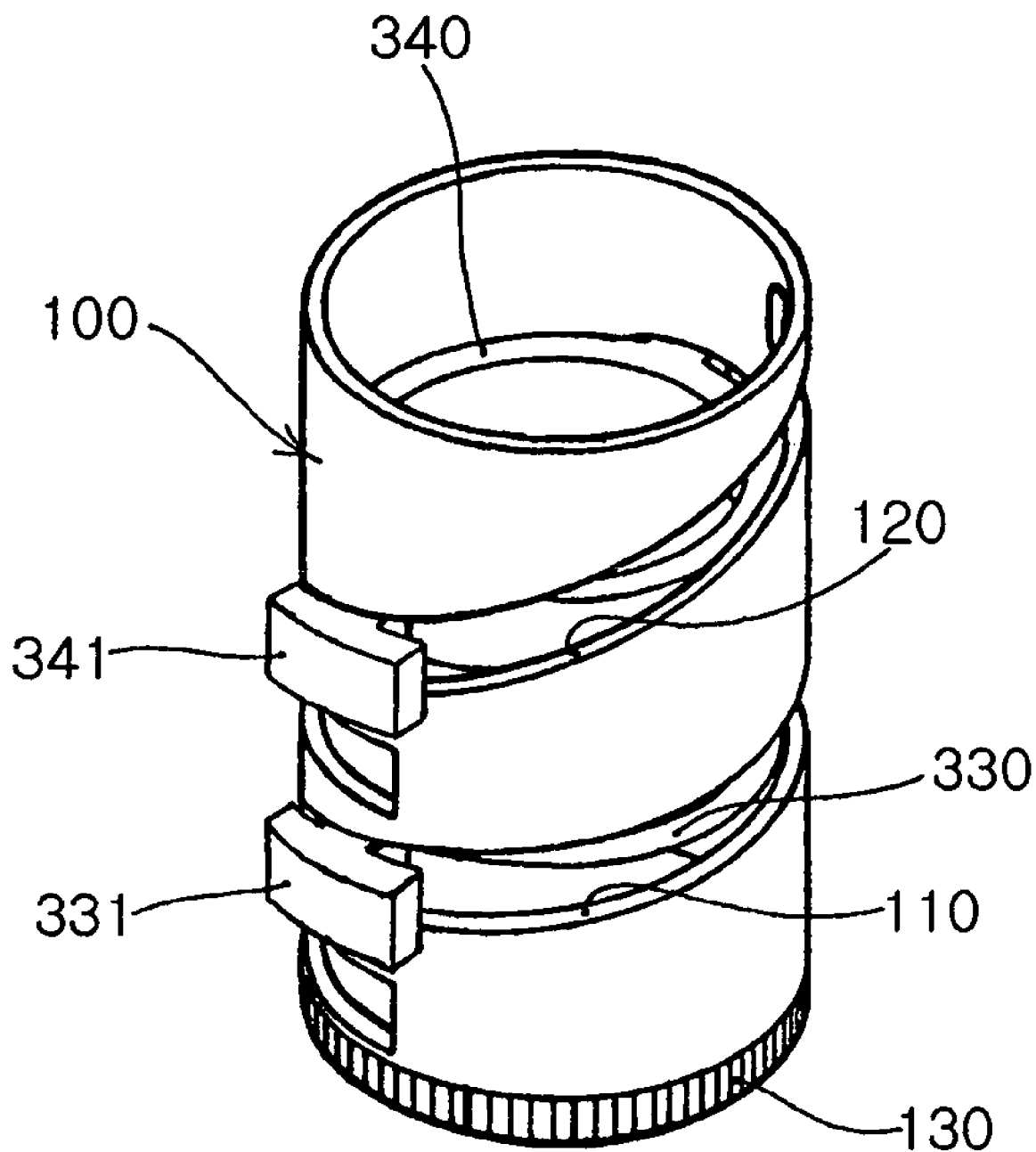
Figure 5C:
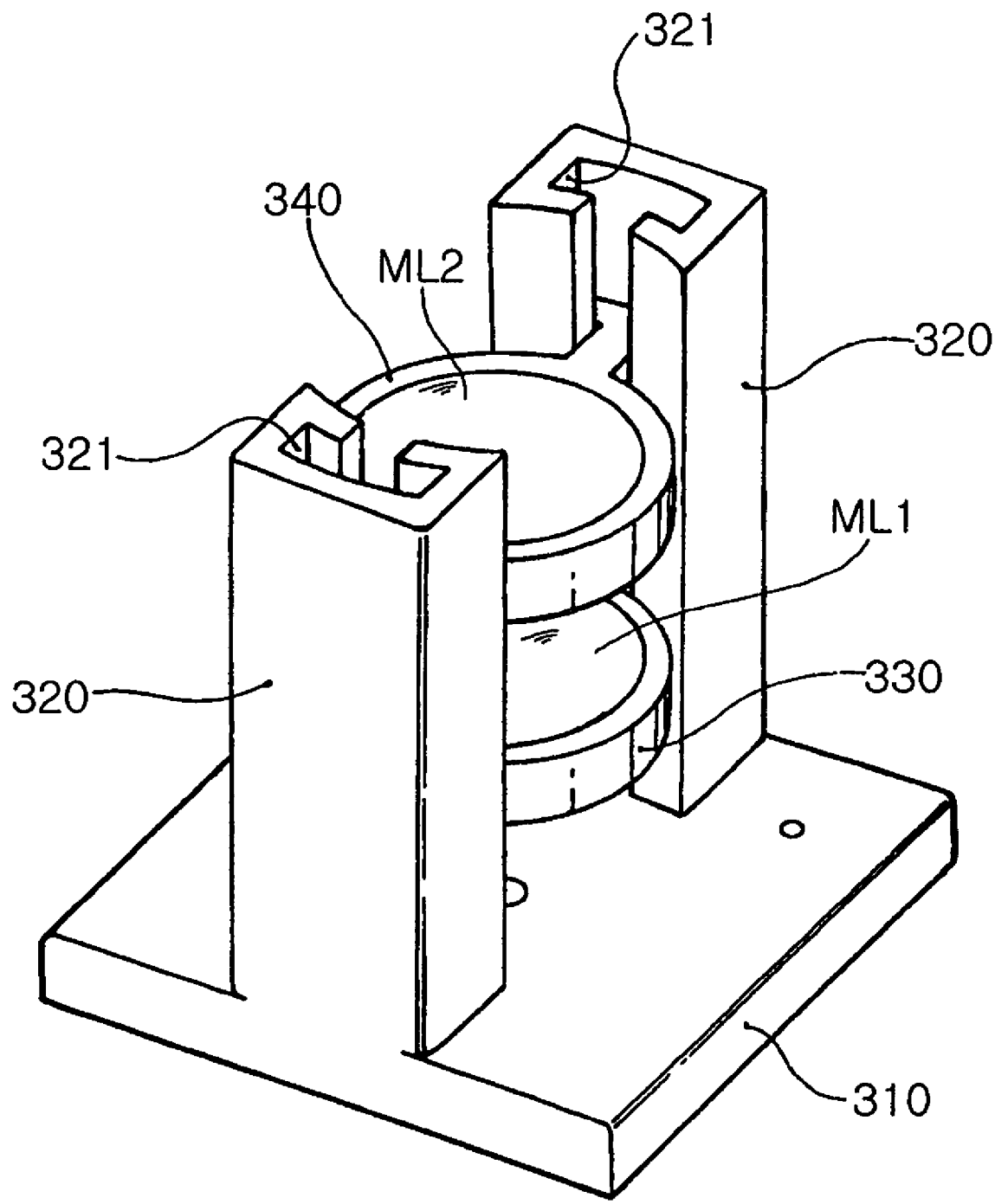
Figure 5D:
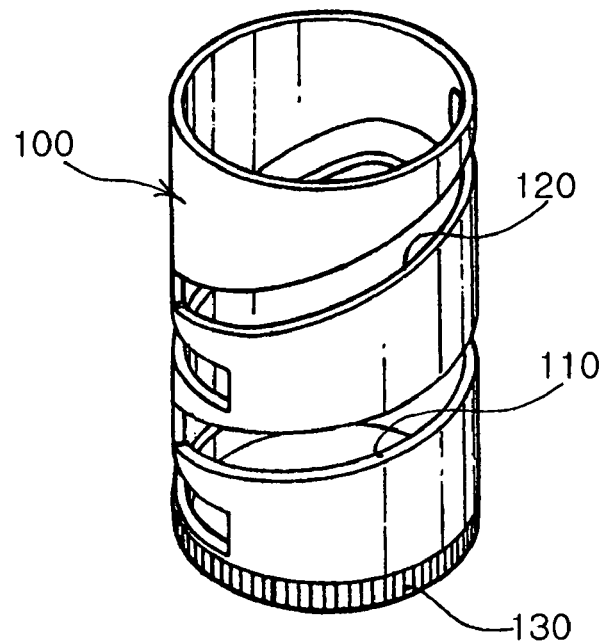
Figure 5E:
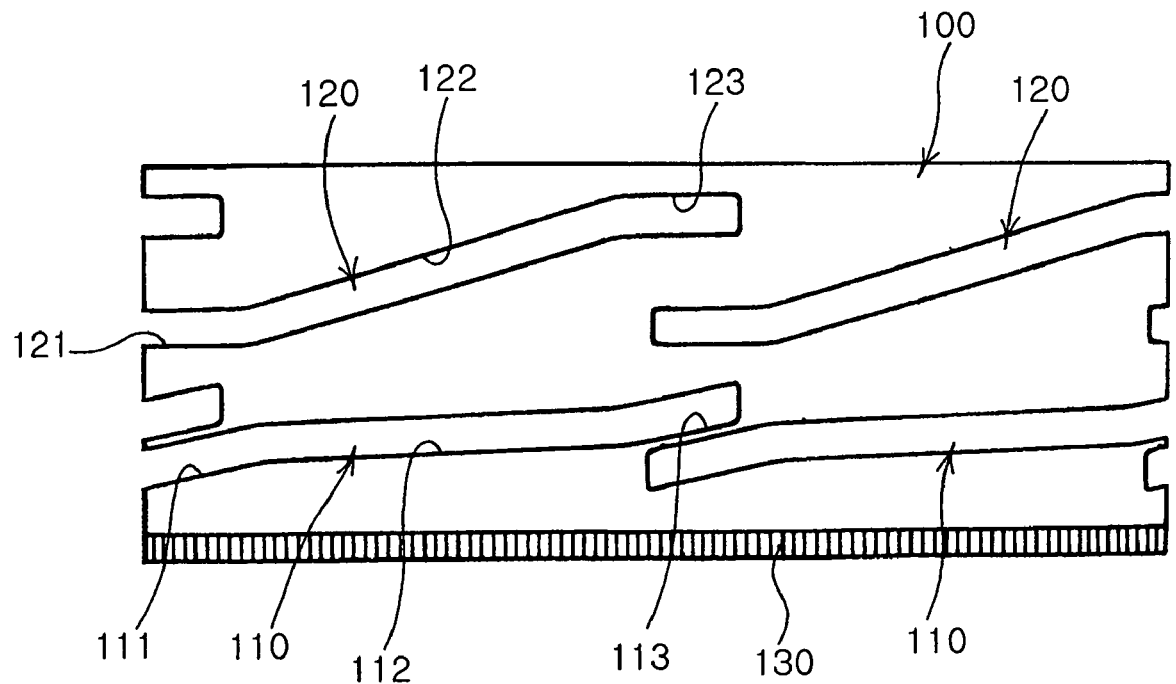
Figure 6A:
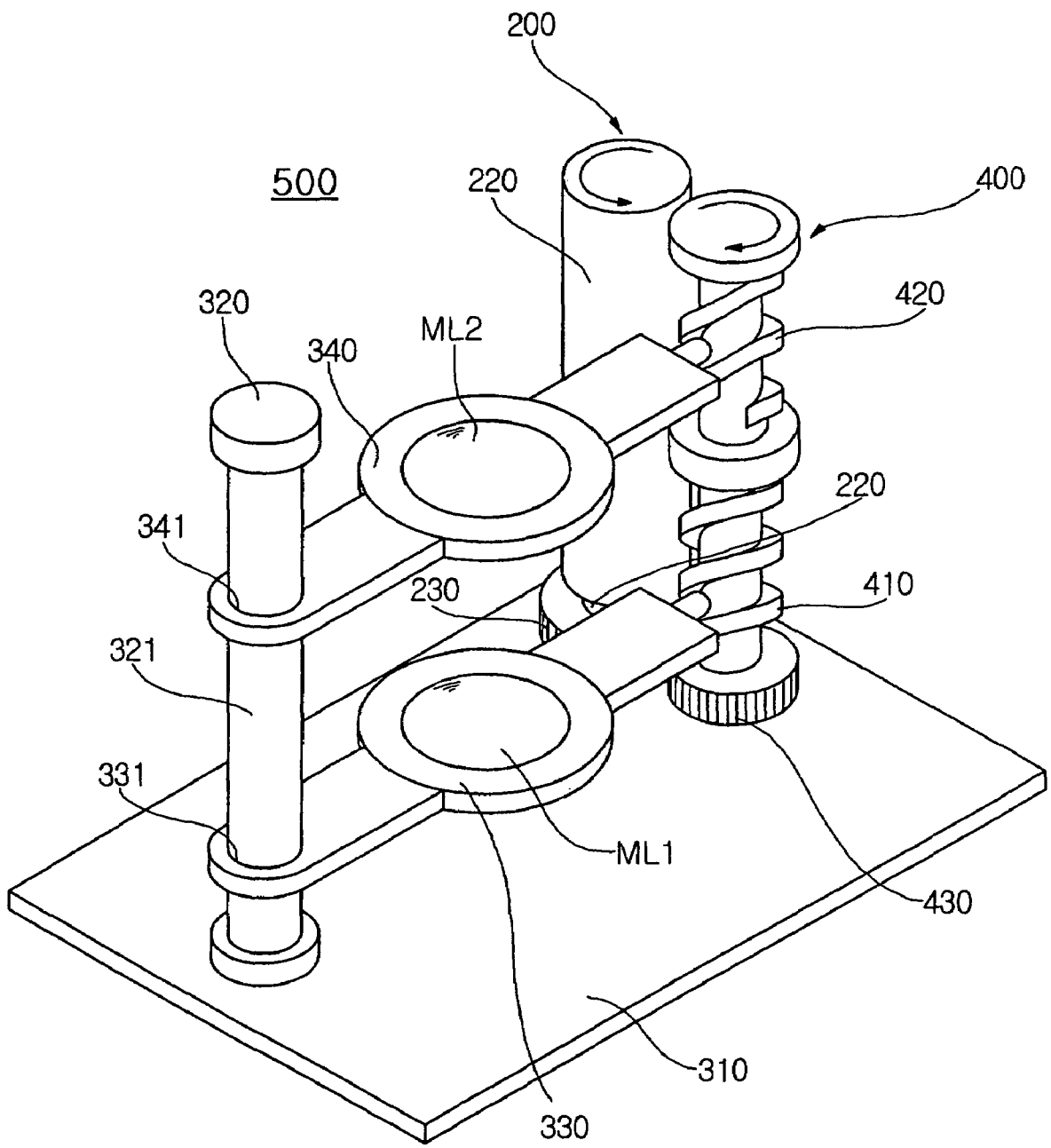

Preferably, as shown in FIGS. 3, 4, and 5e, the first guide part 110 and 410 and the second guide part 120 and 420 can move the first lens ML1 and the second lens ML2 to the zoom positions corresponding to two or more predetermined zoom ratios. For example, as shown in FIG. 3, the first lens ML1 and the second lens ML2 can be moved to the zoom positions with zoom ratios of 1 and 2, and as shown in FIG. 4, to the zoom positions with zoom ratios of 1, 2, and 3, respectively. The predetermined zoom ratios are not limited to the above, and may be altered depending on the designing options. For example, if the intervals between the zoom positions are formed closer, substantially continuous zooming will be allowed.

The first guide part 110 and 210 guides the first lens ML1 during zooming to each of the zoom positions corresponding to the predetermined zoom ratios, and in the subsequent auto-focusing, guides the first lens ML1 to move finely from each of the zoom positions. The second guide part 120 and 420 guides the second lens ML2 to move to each of the predetermined zoom positions during zooming and guides the second lens ML2 to remain stationary at each of the zoom positions during auto-focusing.

Specifically, as shown in FIG. 3, during zooming, the first guide part 110 and 410 moves the first lens ML1 from the zoom position P1 with a zoom ratio of 1 to the zoom position P3 with a zoom ratio of 2, and the second guide part 120 and 420 moves the second lens ML2 from the zoom position P4 with a zoom ratio of 1 to the zoom position P6 with a zoom ratio of 2. On the other hand, during auto-focusing, the first guide part 110 and 210 finely moves the first lens ML1 between P1a and P1b or between P3a and P3b, whereas the second guide part 120 and 420 maintains the second lens ML2 stationary between P4a and P4b, and P6a and P6b on the same optical axis.

As shown in FIG. 4, the first lens ML1 and the second lens ML2 can also be moved to the positions corresponding to three zoom ratios. That is, the first guide part 110 and 210 moves the first lens ML1 from the zoom position P1 with a zoom ratio of 1 to the zoom position P2 with a zoom ratio of 2 (or opposite) or from the zoom position P2 with a zoom ratio of 2 to the zoom position P3 with a zoom ratio of 3 (or opposite). The second guide part 120 and 420 moves the second lens ML2 from the zoom position P4 with a zoom ratio of 1 to the zoom position P5 with a zoom ratio of 2 (or opposite), and from the zoom position P5 with a zoom ratio of 2 to the zoom position P6 with a zoom ratio of 3 (or opposite), or from the zoom position P4 with a zoom ratio of 1 to the zoom position P6 with a zoom ratio of 3 (or opposite). Also during the auto-focusing subsequent to the zooming, the first guide part 110 and 410 finely moves the first lens ML1 between P1a and P1b, P2a and P2b, or P3a and P3b, and at this time, the second guide part 120 and 420 can have the second lens remain stationary between P4a and P4b, P5a and P5b, or P6a and P6b on the same optical axis.

In order to guide the first lens ML1 and the second lens ML2 along the paths as shown in FIG. 3 or 4, the guide parts 110, 120, 410 and 420 are configured to correspond to the paths shown in FIG. 3 or 4, according to the rotation movement of the lens movement guide member 100 and 400, thereby allowing linear movement of the lenses on the optical axis.

As described above, the first lens ML1 and the second lens ML2 are moved along the different paths during zooming and auto-focusing, according to the rotation movement of the lens movement guide member 100 and 400 rotated by the single actuator 200, thereby the zooming and auto-focusing can be performed by the single actuator.

This is made possible by the first guide part 110 and 410 and the second guide part 120 and 420 guiding the first lens ML1 and the second lens ML2 along the paths as shown in FIG. 3 or 4.

Particularly, during auto-focusing, despite the rotation of the lens movement guide member 100 and 400, the second lens ML2 is maintained stationary on the optical axis by the second guide part 120 and 420, thereby performing zooming and auto-focusing by the single actuator.

Preferably, as shown in FIGS. 5a to 5e, the lens movement guide member 100 and 400 may be provided with a lens barrel 100 rotated by the actuator 200.

At this time, the first guide part 110 and the second guide part 120 are formed in guide slots perforated on the outer circumference of the lens barrel 100, so that the first and second lenses ML1 and ML2 are moved along the guide slot.

FIG. 5e is an unfolded view of the lens barrel 100 illustrated in FIG. 5d, showing the guide slots having the same shape as the lens paths shown in FIG. 3. The first guide part 110 and the second guide part 120 are formed to correspond to the paths shown in FIGS. 3 and 4, simultaneously performing zooming and auto-focusing by the single actuator.

Preferably, as shown in FIG. 5e, the second guide part 120 may be provided with a guide slope 122 for guiding the movement of the second lens to each of the zoom positions, and a movement restraint 121 and 123 formed on a plane perpendicular to the rotational axis of the lens barrel 100 to restrain the movement of the second lens ML2 during auto-focusing. The guide slope 122 refers to the path between P4b and P6a, and the movement restraint 121 and 123 refers to the path between P4a and P4b or P6a and P6b in FIG. 3. The shape of the guide parts can vary according to the designing options.

In addition, the first guide part 110 may include a guide slope 112 for guiding the movement of the first lens ML1 to each of the zoom positions during zooming, and a fine guide part 111 and 113 for guiding the first lens ML1 to move finely during auto-focusing. Here, the guide slope 112 refers to the path between P1b and P3a in FIG. 3, and the fine guide part 111 and 113 refers to the path between P1a and P1b or P3a and P3b. As described above, the shape of the guide parts can vary according to the designing options.

The fine guide part 111 and 113 guides the fine movement of the first lens ML1 while the second lens ML2 remains stationary during auto-focusing, which is operated by the same principle of a commonly known auto-focusing device. As described above, for such fine movement, the driving of the actuator 200 can be finely adjusted or the slope of the fine guide part 111 and 113 can be adjusted to be more gradual.

Figure 6B:
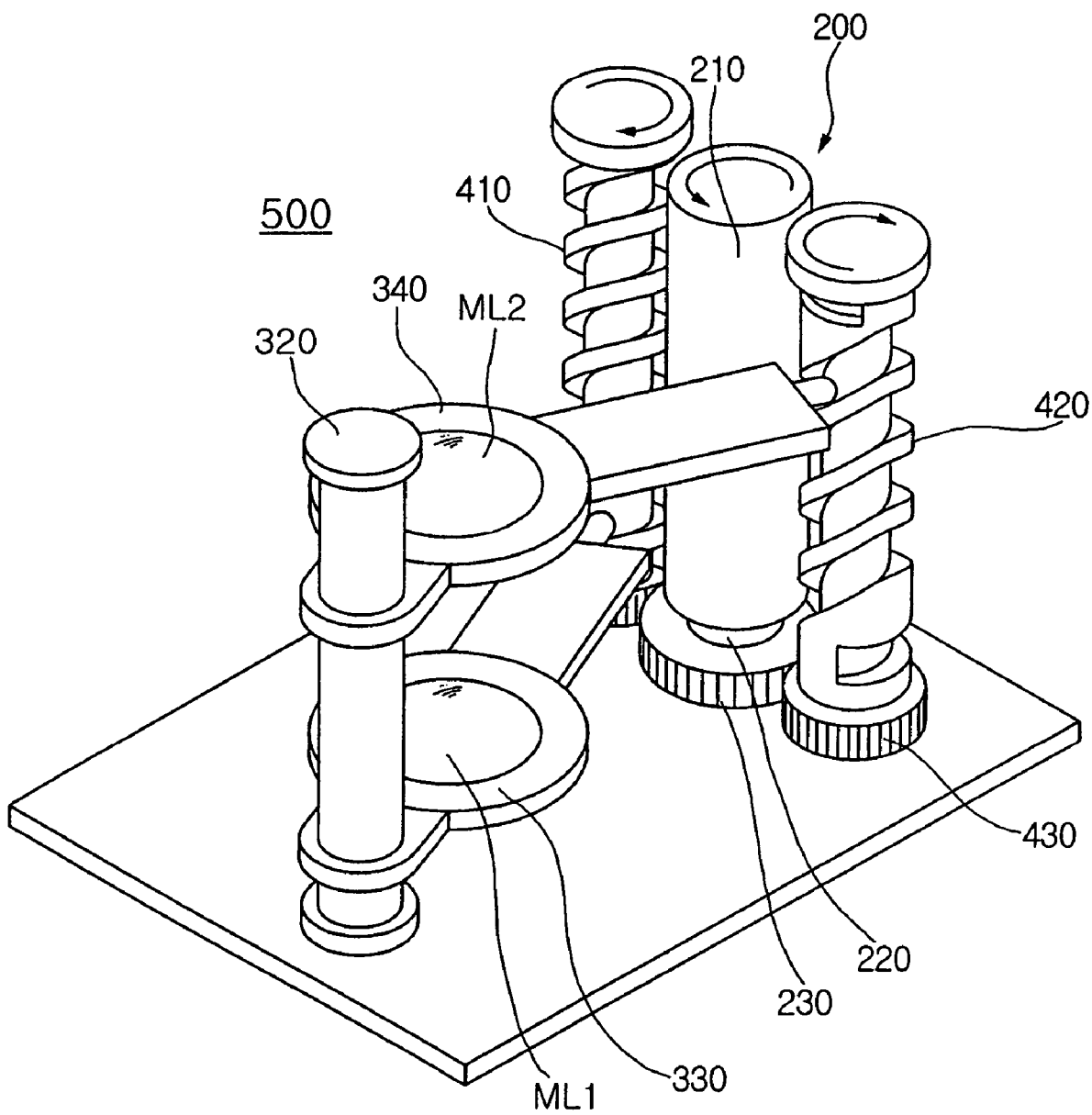
Figure 6C:
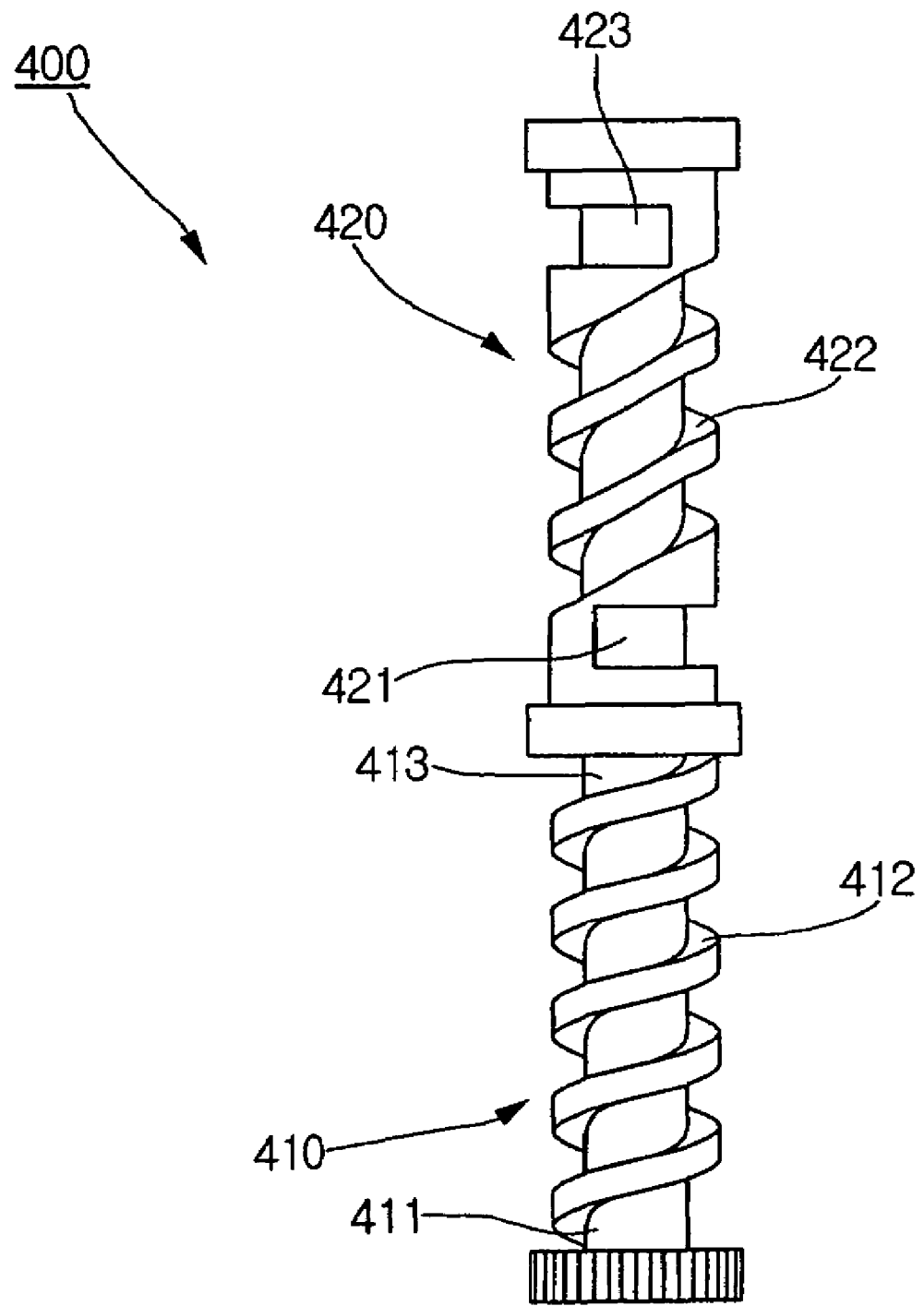

In addition, as shown in FIG. 6b, the lens movement guide member may be provided with lead screws 400 rotated by the actuator 200, and in order to guide the movement of the first lens ML1 and the second lens ML2, two lead screws 400 are provided. The first lens ML1 and the second lens ML2 are guided by screw threads according to the rotation movement of the lead screws 400, each of which corresponds to the first guide part 410 and the second guide part 420, respectively.

Figure 6D:
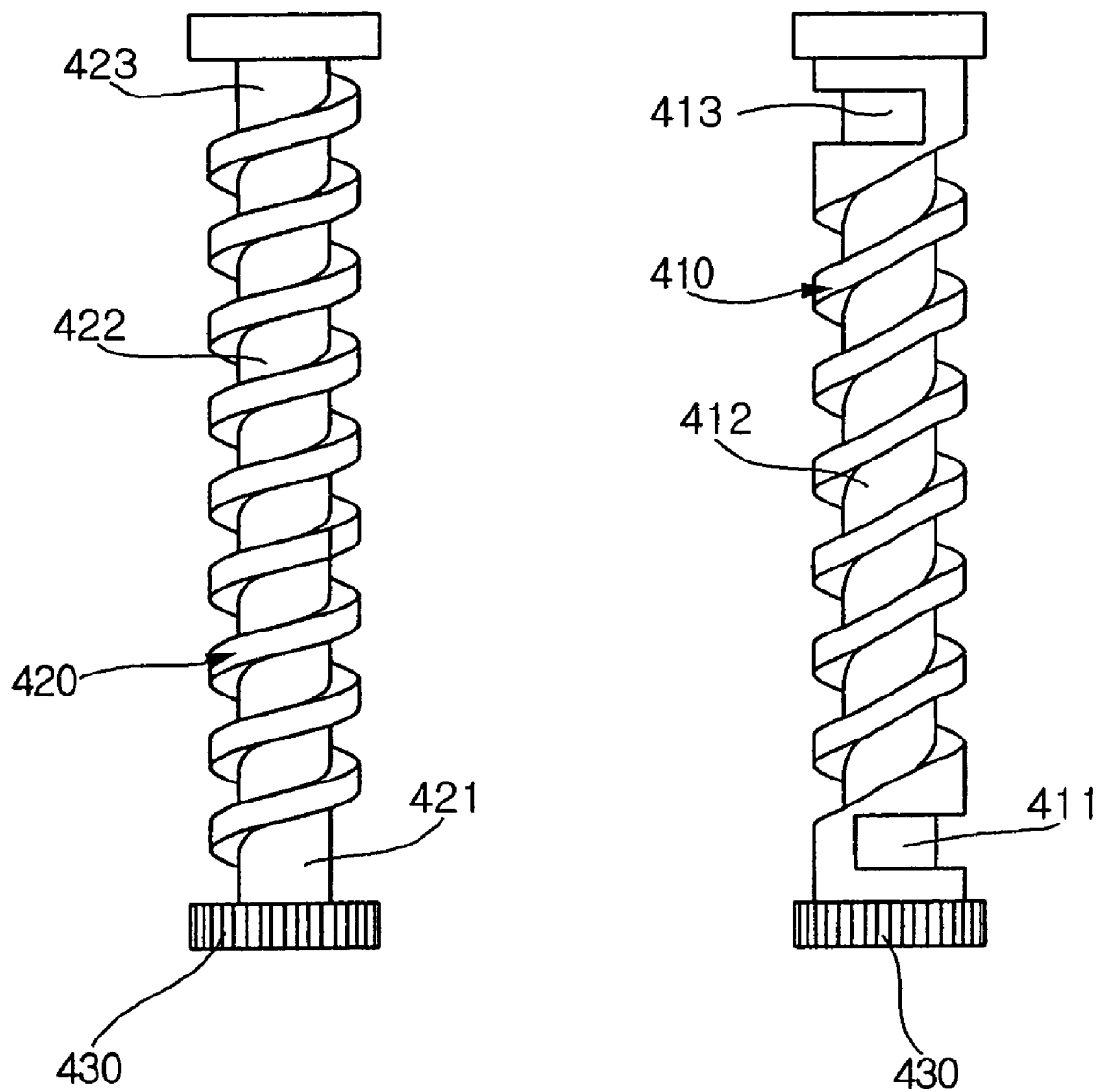

The lead screws 400 can have a shape of screw threads corresponding to the lens paths shown in FIG. 3 or 4. But since it is difficult to fabricate screw threads with different pitches, the screw threads can be fabricated so that the second guide part 420 has linear parts 421 and 423 only at the predetermined zoom positions (both ends only), as shown in FIGS. 6c and 6d. At this time, the first guide part 410 can be screw threads with the same pitch but the rotation amount of the lead screws 400 is controlled at both ends 411 and 413 so that the positions of the lens paths corresponding to the lens paths in FIG. 3 can be realized.

As shown in FIG. 5a, the two lead screws 400 can be vertically assembled together so that they are simultaneously rotated on a same axis by the actuator 200, but they also may be constructed to rotate on different axes, as shown in FIG. 5b.

In addition, in order for the first lens ML1 and the second lens ML2 to be guided in accordance with the rotation movement of the lead screws 400, a lead nut may be provided in the lens holder 330 and 340 as generally known to fit into the screw threads. Also, protrusions may be provided to fit into the screw threads.

On the other hand, as shown in FIGS. 5a to 5c, 6a and 6b, in order to move the first lens ML1 and the second lens ML2, the protrusions of the first lens holder 330 having the first lens ML1 therein and the second lens holder 340 having the second lens ML2 therein can be disposed so that they are in contact with the first guide part 110 and 410 and the second guide part 120 and 420, respectively. In addition, the lenses may be provided with a protrusion thereon to be in contact with the first guide part 110 and 410 and the second guide part 120 and 420.

The actuator 200 rotates the lens movement guide member 100 and 400, and provides driving power necessary for zooming and auto-focusing. As shown in FIGS. 5a, 6a, and 6b, the actuator 200 includes the main body 210 for providing rotating power, a driving shaft 220, and a rotary member 230 connected to the driving shaft 220.

The rotary member 230 of the actuator 200 can adopt generally known means for transmitting rotation power such as a gear, and transmits rotation power to a driven rotary member 130 of the lens barrel 100 or the lead screws 400 to provide driving power necessary for moving the lenses.

In addition, the actuator 200 provides rotation power to the lens movement guide member 100 and 400, and can adopt generally known types of motor for moving the lenses such as a piezoelectric driver, a staffing motor, and an ultrasonic motor.

Preferably, as shown in FIGS. 5 and 6, the lens driving device 500 according to the present invention may further include an optical axis guide part 320 for guiding the movement of the first lens ML1 and the second lens ML2 to be moved along the optical axis.

The optical axis guide part 320 is fixed to a base plate 310 having the image sensor installed thereon.

At this time, as shown in FIG. 5, the optical axis guide part 320 can have a structure having a groove 321 guiding the protrusions 331 and 341 of the lens holder 330 and 340, and also as shown in FIGS. 6a and 6b, may be in a structure having a guide pin 321 guiding guide holes 331 and 341 of the lens holder 330 and 340. In addition, as in a generally known lens driving device, a fixed barrel having a cylindrical shape and a groove formed along the optical axis may be used.

Now, the operations of the present invention with the above described construction will be explained with reference to FIGS. 3 and 5.

First, the actuator 200 is operated to perform zooming, then the driven rotary member 130 of the lens movement guide member 100 connected to the rotary member 230 is rotated, and thereby the lens movement guide member 100 is rotated. Thereby, the first lens ML1 and the second lens ML2 are guided by the guide slope 112 of the first guide part 110 and the guide slope 122 of the second guide part ML2 formed on the lens movement guide member 100, and moved from P1 and P4 to P3 and P6 in FIG. 3, respectively.

After zooming, as the actuator is finely driven during the subsequent auto-focusing, the lens movement guide member 100 is also finely rotated forward or backward. Thereby, the first lens ML1 and the second lens ML2 are guided by the fine guide part 113 of the first guide part 110 and the movement restraint 123 of the second guide part 120 so that they are finely moved between P3a and P3b, and P6a and P6b. That is, the second lens ML2 is guided by the movement restraint 123 to maintain the same position on the optical axis despite the rotation of the lens movement guide member 100. On the contrary, the first lens ML1 is guided by the fine guide part 113 to be finely moved forward and backward, and the relative distance with the second lens ML2 changes. Therefore, moving only the first lens ML1 after zooming allows performing zooming and auto-focusing by the single actuator 200.

The above described process makes zooming and auto-focusing possible by the single actuator 200.

In the meantime, as shown in FIG. 4, if the zoom ratio is more than three, the actuator needs to be driven continuously so that the lens is moved to the specific zoom position to perform zooming. For example, the first lens ML1 and the second lens ML2 are moved from the zoom positions P1 and P4 with a zoom ratio of 1 to the zoom positions P3 and P6 with a zoom ratio of 3, and subsequently the auto-focusing can be performed in the same positions as described above.

The operations of the present invention will be explained with reference to Example where detailed numeric values are applied. The example explained below is exemplary only where the lens driving device of the present invention is applied but present invention can be applied to a variety of zoom lens systems.

EXAMPLE

FIG. 7a is a block diagram showing the lens arrangement at a wide angle end of the zoom lens system according to the embodiment of the present invention, and FIG. 7b is a block diagram illustrating the lens arrangement at a telephoto end.

As shown in FIGS. 7a and 7b, the zoom lens system used in the lens driving device of the present Example includes, sequentially from an object side: a first lens group LG1 disposed stationary and having negative refractive power; a second lens group LG2 having positive refractive power and moving in the direction to decrease an interval between the first lens group LG1 and the second lens group LG2 as zooming from a wide angle end to a telephoto end; a third lens group LG3 having negative refractive power and moving such that a position of an image plane is corrected according to the zooming by the movement of the second lens group LG2; and a fourth lens group LG4 disposed stationary and having positive refractive power.

Further, an aperture S is provided between the first lens group LG1 and the second lens group LG2. An image sensor (IS) that corresponds to an image plane is arranged behind the fourth lens group LG4.

Specifically, the first lens group LG1 consists of a first lens L1 which is a negative meniscus lens convex toward an object side and a second lens L2 concaved on its both sides. The second lens group LG2 consists of a third lens L3 that is convex on its both sides and a fourth lens L4 which is a positive meniscus lens convex toward an object side. The third lens group LG3 consists only of a fifth lens L5 concaved on its both sides. The fourth lens group LG4 consists only of a sixth lens L6 having positive refractive power.

According to Example, an effective focal length $f_w$ of the entire lens system at a wide angle end is 8.5 mm and an effective focal length $f_T$ of the entire lens system at a telephoto end is 17.0 mm. An effective focal length $f_I$ of the first lens group LG1 is −7.45 mm, an effective focal length $f_{II}$ of the second lens group LG2 is 3.36 mm, and effective focal length $f_{III}$ of the third lens group LG3 is −1.79 mm, and an effective focal length $f_{IV}$ of the fourth lens group LG4 is 8.66 mm.

Further, F-number $F_{No}$ is 2.8 at a wide angle end, 4.3 at a telephoto end, and an entire angle of view 2ω is 62° at a wide angle end, 34° at a telephoto end. A total length (TL) from the first lens L1 of the first lens group LG1 to an image plane (IP) is 25.0 mm.

Table 1 below shows the numeric values of lens in Example when focused at an object distance of 777 mm.

TABLE 1

| Plane No. | Radius of curvature R (mm) | Plane interval t (mm) | Refractive index $n_d$ | Abbe number $V_d$ | Remark |
|---|---|---|---|---|---|
| 1 | 11.0100 | 1.0000 | 1.487 | 70.4 | 1st lens |
| 2 | 4.7950 | 2.1300 | — | — | |
| *3 | −10.7970 | 0.7000 | 1.529 | 55.4 | 2nd lens |
| *4 | 23.2630 | ⋇variable 1 | — | — | |
| *5 | 5.7820 | 2.5392 | 1.487 | 70.4 | 3rd lens |
| *6 | −3.7530 | 0.1000 | — | — | |
| *7 | 4.5350 | 1.9717 | 1.592 | 68.3 | 4th lens |
| *8 | 30.3950 | ⋇variable 2 | — | — | |
| *9 | −2.1360 | 0.9975 | 1.755 | 27.5 | 5th lens |
| *10 | 4.5950 | ⋇variable 3 | — | — | |
| *11 | 13.3980 | 2.0741 | 1.625 | 35.5 | 6th lens |
| *12 | −8.6530 | 6.4679 | — | — | |
| 13 | ∞ | — | — | — | Image plane |

In Table 1, ⋇ represents a refraction plane whose inter-plane interval is varied upon zooming. The inter-plane intervals at a wide angle end and at a telephoto end when focused at an object distance of 777 mm, are given by Table 2 below.

TABLE 2

| | Wide angle end (mm) | Telephoto end (mm) |
|---|---|---|
| Variable 1 | 0.5301 | 5.2368 |
| Variable 2 | 5.9101 | 0.5000 |
| Variable 3 | 0.5794 | 1.2828 |

In addition, ⋇ represents an aspherical surface which is obtained by following known formula 1 and 'E and a number following the E' used in conic constants K and aspherical coefficients A, B, C, and D represent a 10's power. For example, E+12 and E−04 represent $10^{12}$ and $10^{−4}$, respectively.

$$Z=(Y^2/r)[1+\sqrt{1-(1+K)(Y/r)^2}]+AY^4+BY^6+CY^8+DY^{10} \quad \text{Formula 1}$$

Z: distance toward an optical axis from a vertex of a lens
Y: distance toward a direction perpendicular to an optical axis
r: radius of curvature on a vertex of a lens
K: conic constant
A,B,C, and D: aspherical coefficients Conic constants K and aspherical coefficients A, B, C, and D by the formula 1 are given by Table 3 as follows.

TABLE 3

| Plane No. | K | A | B | C | D |
|---|---|---|---|---|---|
| 3 | −1.0633E+24 | −2.6038E−03 | 1.2676E−04 | −4.9714E−06 | 1.3610E−07 |
| 4 | −1.0161E+00 | −2.4984E−03 | 1.5376E−04 | −7.0298E−06 | 2.0348E−07 |
| 5 | 1.0955E−01 | 5.5745E−03 | −1.9698E−04 | −3.1409E−06 | −1.6930E−07 |
| 6 | −9.5323E+21 | −1.3387E−04 | −1.4083E−04 | −6.0112E−06 | 2.8832E−07 |
| 7 | −3.9884E−01 | 7.2837E−03 | −7.8767E−05 | 3.6664E−06 | −2.0472E−07 |
| 8 | 9.4576E+01 | 1.6469E−03 | 1.8853E−04 | | |
| 9 | −1.3635E+14 | −4.0201E−03 | −2.2835E−05 | 5.5840E−06 | |
| 10 | 6.3167E−01 | −2.8046E−03 | 1.8877E−05 | −1.3947E−05 | |
| 11 | −4.2785E+01 | 2.1247E−03 | −5.4964E−05 | 1.1332E−06 | |
| 12 | −3.8393E+12 | 8.8011E−05 | 7.4748E−05 | −3.8909E−06 | 8.6198E−08 |

Figure 7:
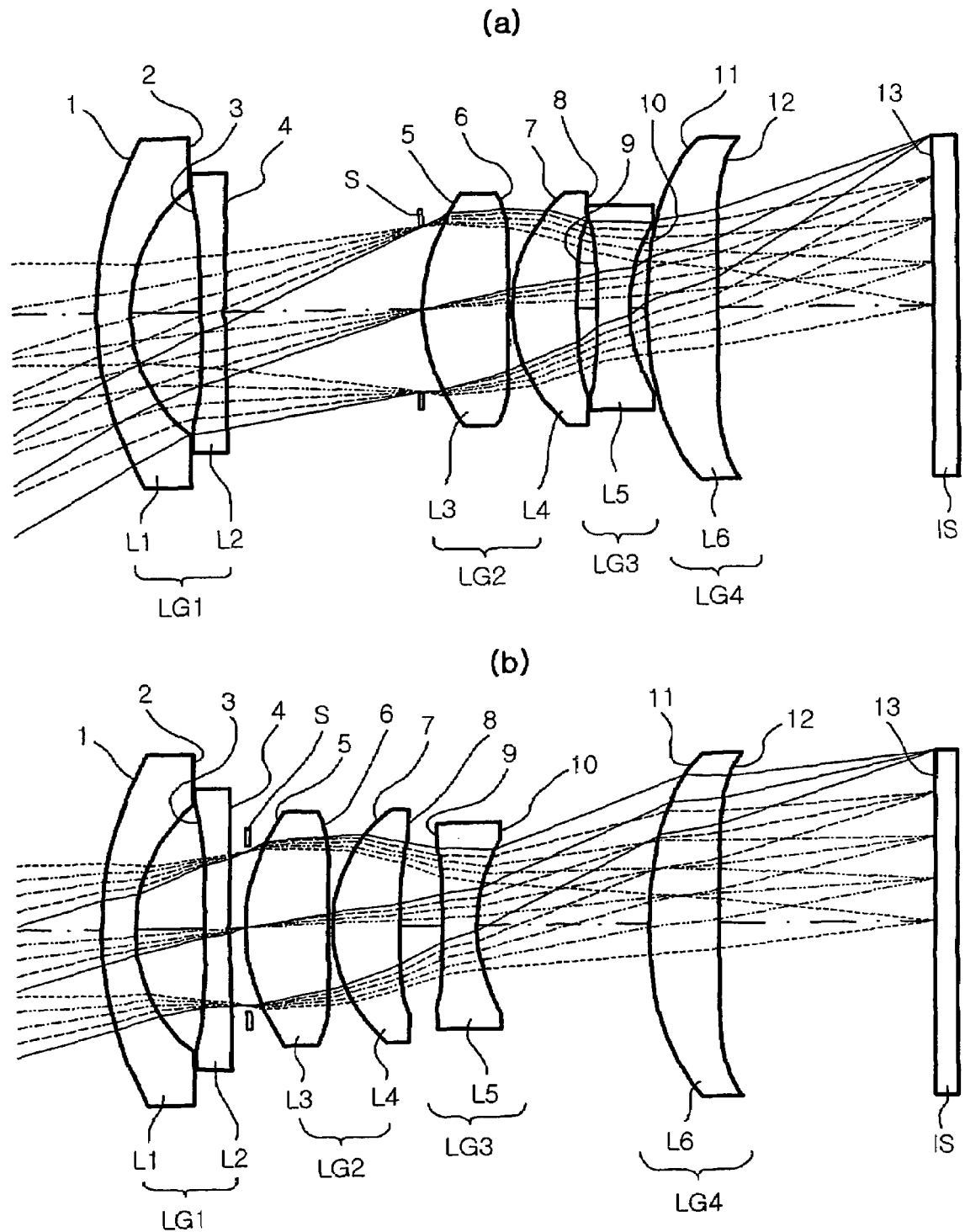
Figure 8:
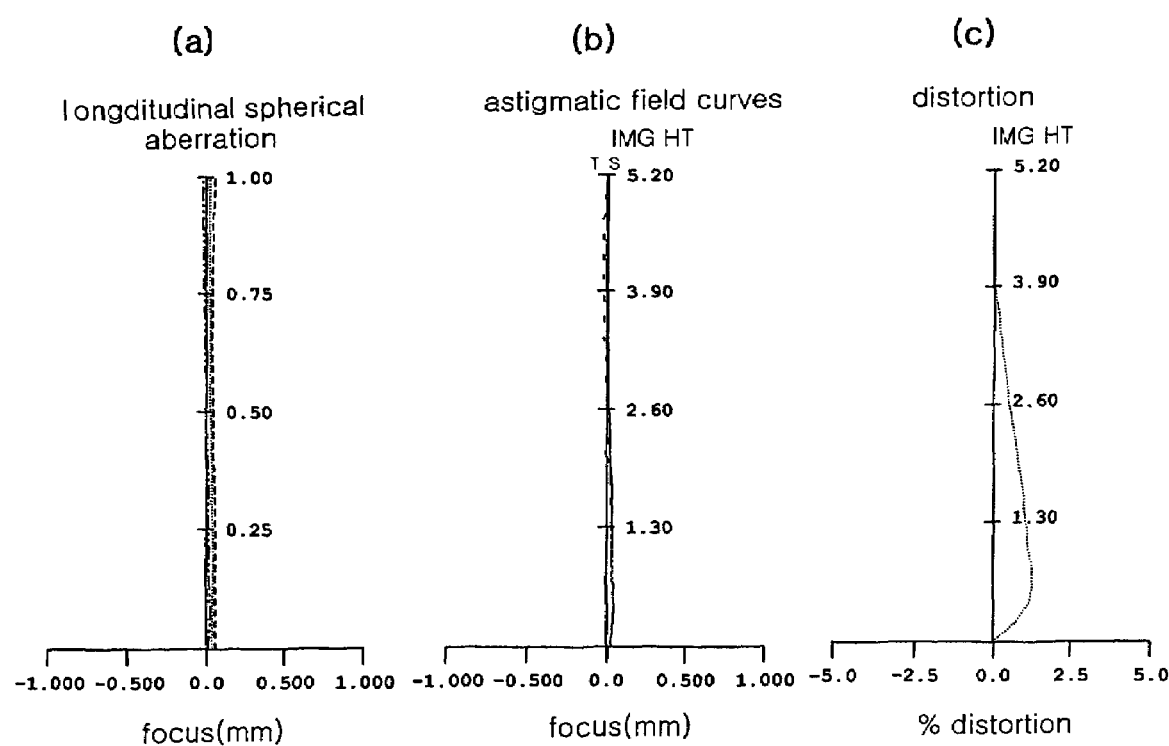
Figure 9:
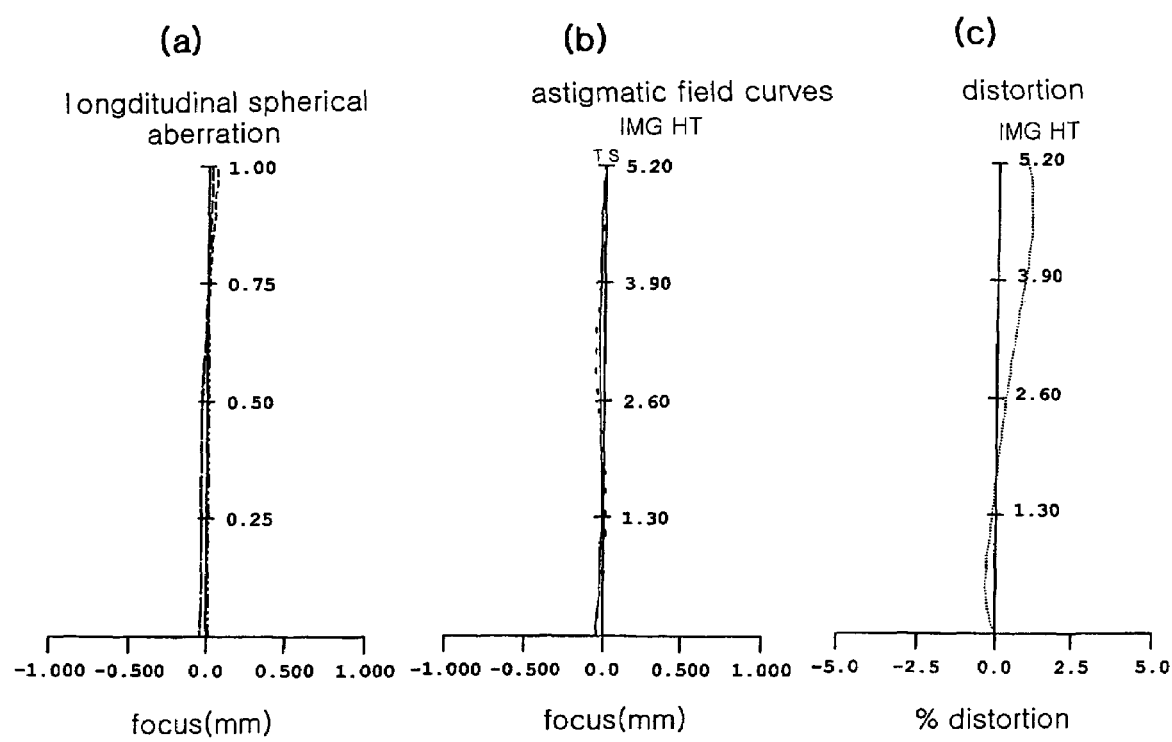

FIGS. 8a to 9c represent the aberrations when focused at an object distance of 777 mm in the lens system shown in FIG. 7. FIGS. 8a to 8c represent a spherical aberration, astigmatism, and distortion, respectively, at a wide angle end, and FIGS. 9a to 9c represent aspherical aberration, astigmatism, and distortion, respectively, at a telephoto end. Here, in the graph illustrating astigmatism, "S" and "T" represent sagittal and tangential, respectively.

In general, in the case of zooming, the lenses are focused with respect to a predetermined object distance, and the present embodiment describes the case in which lenses are focused at an object distance of 777 mm at the zoom position.

As described above, when the object is set at a predetermined position, aberrational characteristics are satisfactory as shown in FIGS. 8a to 8c and 9a to 9c.

However, the object is not usually set in a fixed position when zooming, and therefore, if the object distance is changed to 400 mm, the lens system becomes unfocused. Therefore, the present invention solves the above problem by performing auto-focusing after zooming, thereby performing zooming and auto-focusing by a single actuator.

For example, comparing the case when focused at an object distance of 400 mm in the lens system in FIG. 7 with the case when focused at an object distance of 777 mm, the inter-plane intervals between the 10$^{th}$ plane 10 and the 11$^{th}$ plane 11 are as follows in Table 4 below.

TABLE 4

| Object distance | Wide angle end | Telephoto end |
|---|---|---|
| 777 mm | 0.5794 mm | 1.2828 mm |
| 400 mm | 0.5844 mm | 1.3089 mm |

Figure 10:
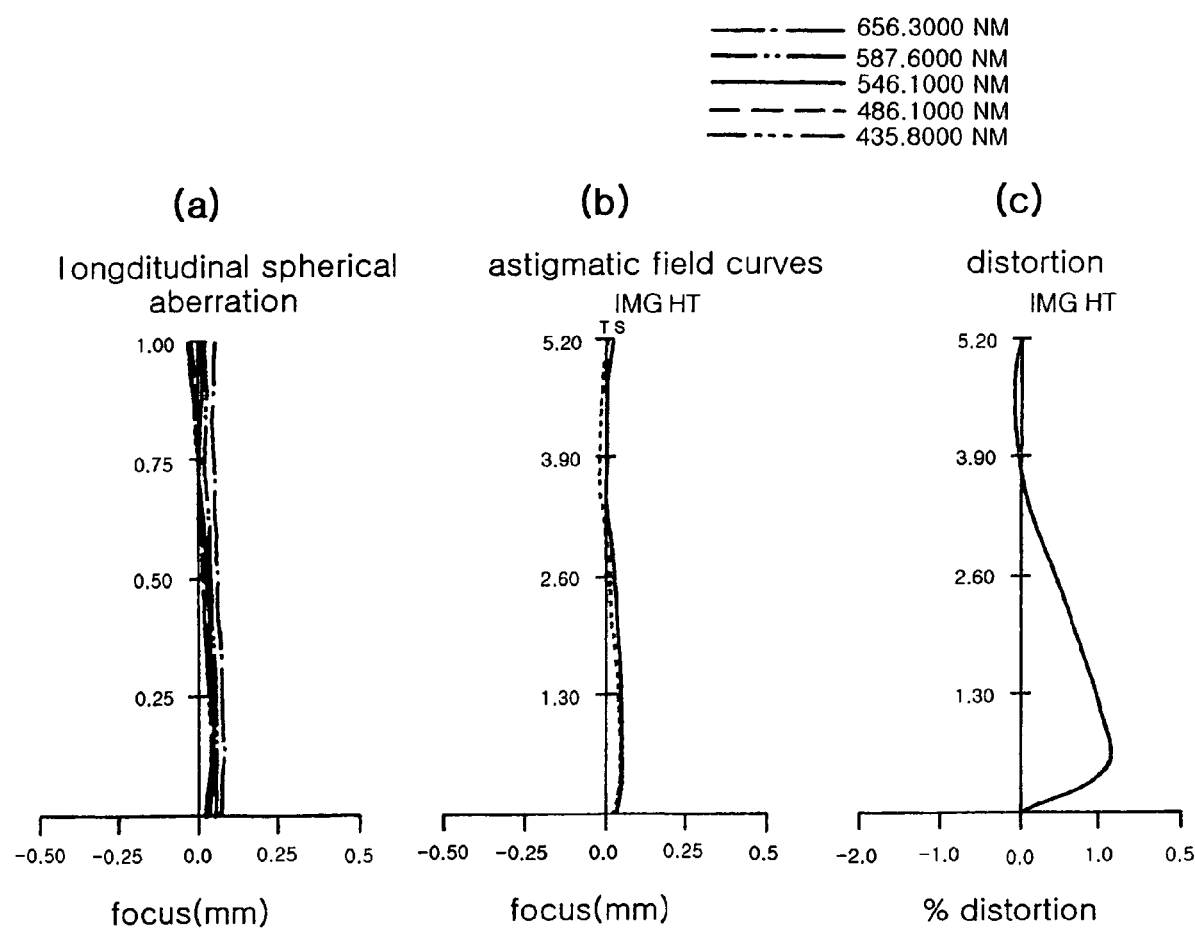
Figure 11:
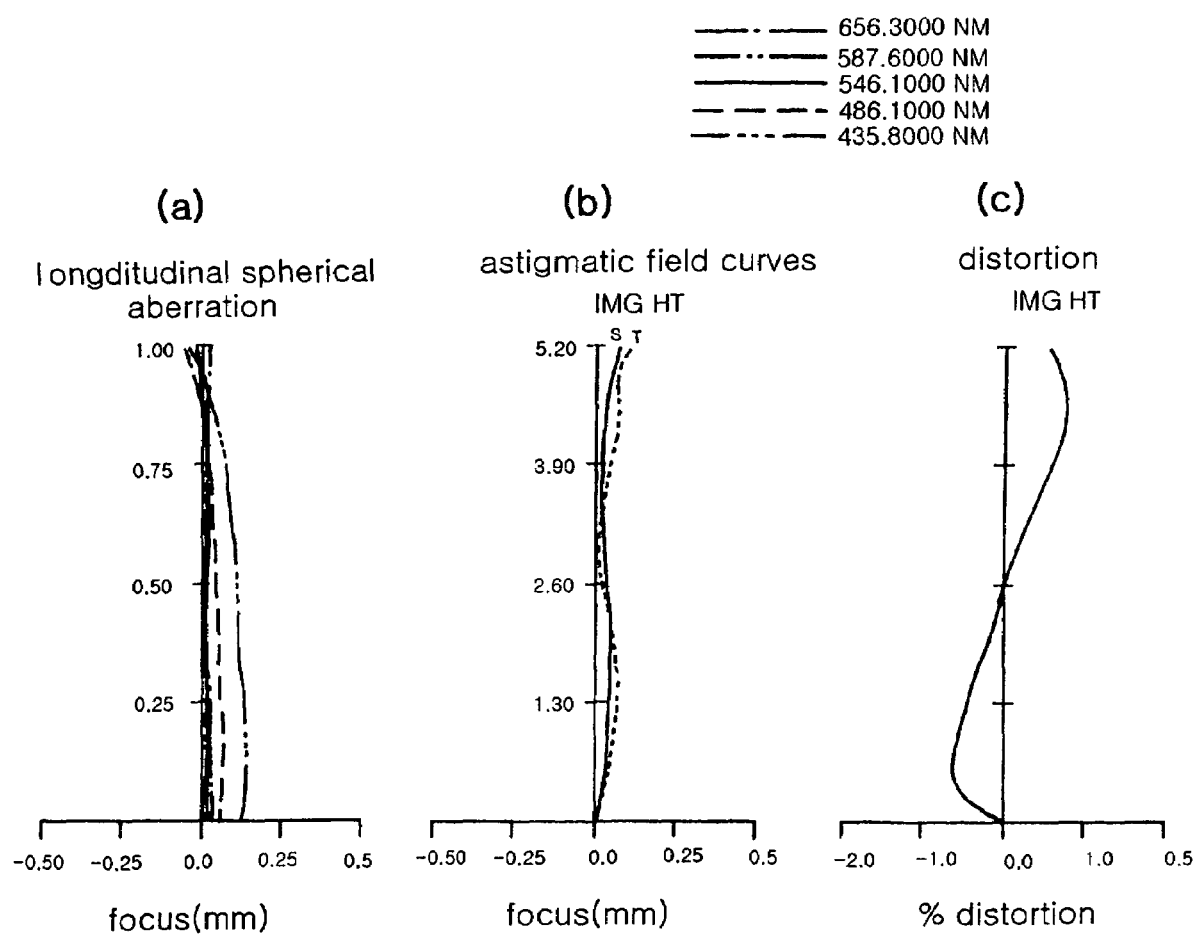
Figure 12:
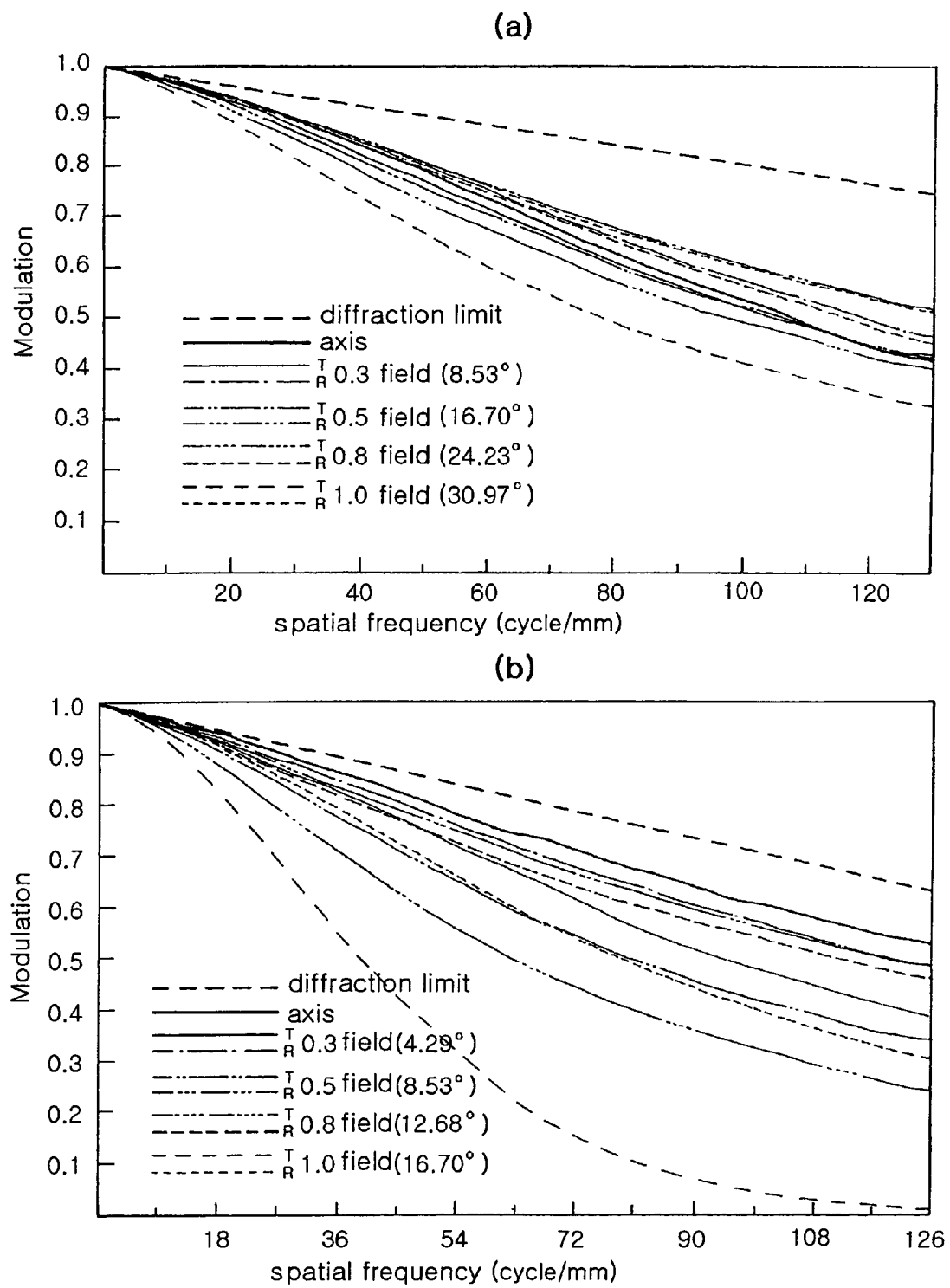

FIGS. 10a to 12b represent the aberrations and the MTF curves in the case when focused at an object distance of 400 mm in the lens system shown in FIGS. 7a and 7b. FIGS. 10a to 10c represent a spherical aberration, astigmatism, and distortion, respectively, at a wide angle end, and FIGS. 11a to 11c represent a spherical aberration, astigmatism, and distortion, respectively, at a telephoto end. Also, FIGS. 12a and 12b are graphs representing the MTF characteristics at a wide angle end and a telephoto end, respectively.

Here, the MTF depends on a spatial frequency of a cycle per millimeter and is defined by following formula 2 between a maximum intensity and a minimum intensity of light.

$$MTF = \frac{Max - Min}{Max + Min} \quad \text{Formula 2}$$

That is, if the MTF is 1, a resolution is most ideal and a resolution deteriorates as the MTF is reduced.

Therefore, in the present invention, auto-focusing takes place after zooming, which allows for an optical system with superior aberrations and MTF characteristics, for which only single actuator is used, achieving miniaturization.

Comparative Example

If the lenses are not focused corresponding to the object distance in the lens system shown in FIG. 7, the aberrations and MTF characteristics are greatly deteriorated as will be explained below.

Figure 13:
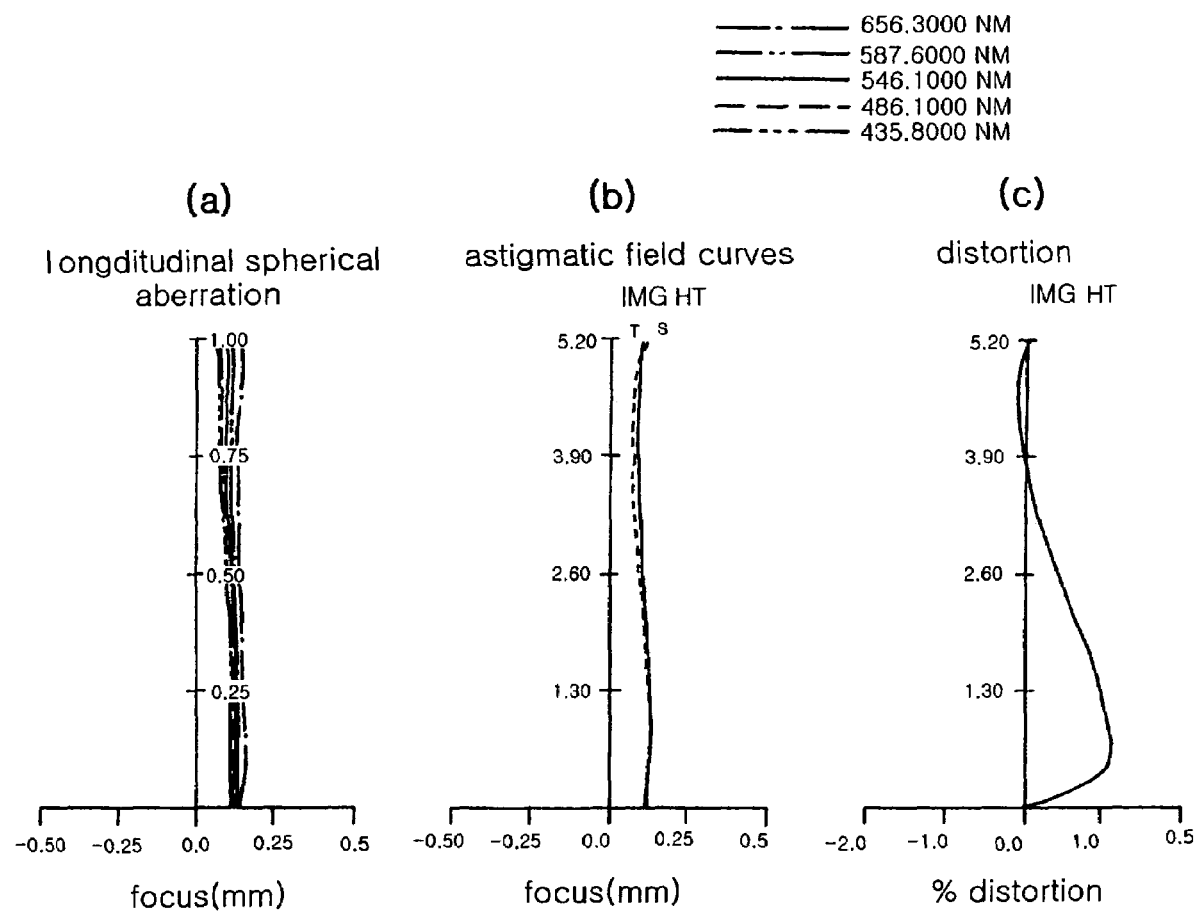
Figure 14:
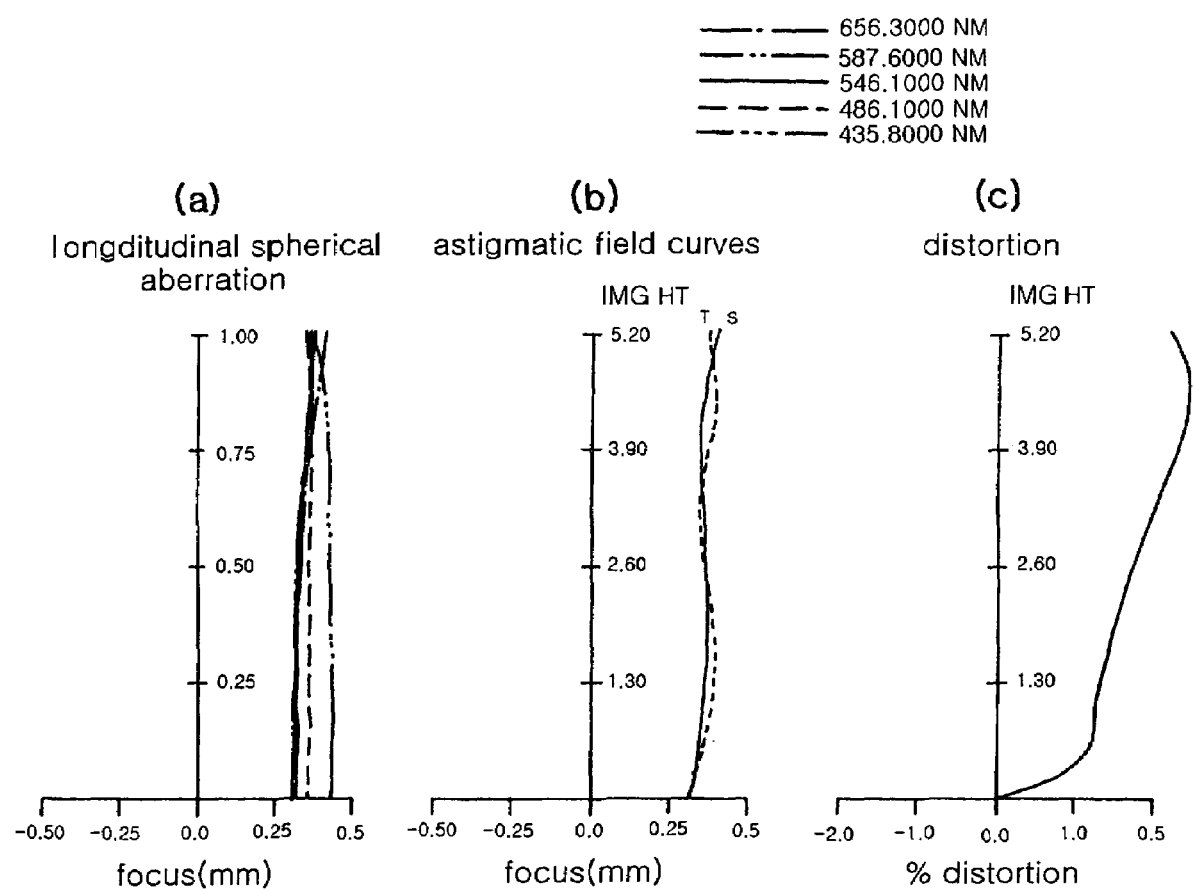
Figure 15:
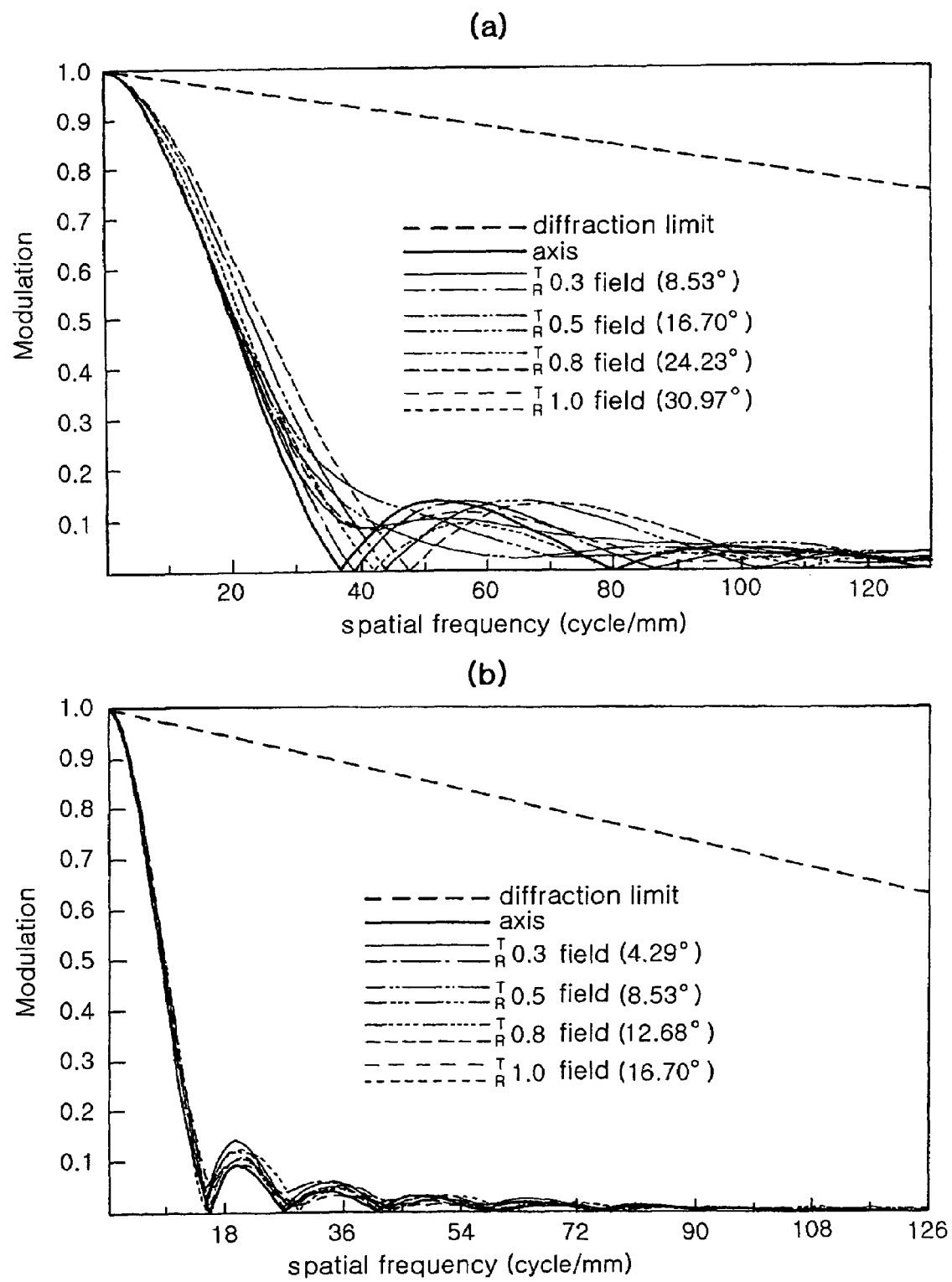

FIGS. 13a to 15b represent aberrations and MTF lines when focused at an object distance of 777 mm, which is then changed to 400 mm. FIGS. 13a to 13c represent a spherical aberrations, astigmatism, and distortion, respectively, at a wide angle end. FIGS. 14a to 14c represent a spherical aberrations, astigmatism, and distortion, respectively, at a telephoto end. In addition, FIGS. 15a and 15b represent the MTF curves at a wide angle end and a telephoto end, respectively.

As shown in Table 4, in the case when the lenses are finely moved at a wide angle end and a telephoto end to be focused according to the object distance, the zoom lens systems exhibits satisfactory aberrations and MTF characteristics.

However, if zooming is simply performed without finely focusing corresponding to the object distance, aberrations are deteriorated, as shown in FIGS. 13a and 14c, and particularly, the MTF characteristics are greatly deteriorated as shown in FIGS. 15a and 15b.

Therefore, performing zooming and auto-focusing functions using the lens driving device according to the present invention allows obtainment of the zoom lens system with superior optical characteristics by using a single actuator, enabling miniaturization and light weight.

As set forth above, the present invention allows zooming and auto-focusing through a single actuator, with superior optical characteristics at each zoom ratio.

Moreover, since only a single actuator is provided, miniaturization and light weight of the lens driving device is possible, with advantages of simple structure, lower manufacturing costs, and lower consumption of power.

Furthermore, since only one lens is relatively moved to adjust focus, controlling operation of auto-focusing is simpler.

While the present invention has been shown and described in connection with the preferred embodiments, it will be apparent to those skilled in the art that modifications and variations can be made without departing from the spirit and scope of the invention as defined by the appended claims.

What is claimed is:

1. A lens driving device for moving lenses to perform zooming and automatic focusing comprising:
   a first lens disposed movable during zooming and automatic focusing;
   a second lens disposed movable during zooming independently from the first lens;
   a lens movement guide member having a first guide part for guiding the movement of the first lens so that the first lens is moved during zooming and finely moved from a zoom position with respect to the second lens during automatic focusing, and a second guide part for guiding the movement of the second lens so that the second lens is moved during zooming and remains stationary on an optical axis during automatic focusing, wherein the lens movement guide member is rotated to move the first and second lenses; and
   an actuator providing driving power necessary to move the first and second lenses during zooming and automatic focusing;
   whereby both the first and second lenses are moved during zooming and subsequently, only the first lens is finely moved during automatic focusing so that zooming and automatic focusing is performed by the single actuator.

2. The lens driving device according to claim 1, wherein the first guide part is configured to guide the movement of the first lens so that the first lens is moved to each of zoom positions corresponding to at least two predetermined zoom ratios during zooming, and is finely moved from each of the zoom positions during automatic focusing, and
   the second guide parts is configured to guide the movement of the second lens so that the second lens is moved to predetermined zoom positions during zooming, and remains stationary in each of the zoom positions during automatic focusing.

3. The lens driving device according to claim 2, wherein the second guide part comprises a guide slope for guiding the movement of the second lens to each of the zoom positions, and a movement restraint formed on a plane perpendicular to the rotational axis of the movement guide member to restrain the movement of the second lens from each of the zoom positions during automatic focusing.

4. The lens driving device according to claim 1, further comprising an optical axis guide part for guiding the movement of the first and second lenses so that the first and second lenses are moved along the optical axis.

5. The lens driving device according to claim 1, wherein either the first lens or the second lens comprises a plurality of lenses.

6. The lens driving device according to claim 1, further comprising a first lens holder having the first lens installed therein, and a second lens holder having the second lens installed therein, wherein the movement of the first lens holder and the second lens holder is guided by the lens movement guide member.

7. A lens driving device for moving lenses to perform zooming and automatic focusing comprising:
   a first lens moved during zooming and automatic focusing;
   a second lens moved independently from the first lens during zooming;
   a lens movement guide member having a first guide part for guiding the movement of the first lens so that the first lens is moved to each of zoom positions during zooming and finely moved from each of the zoom positions with respect to the second lens during automatic focusing, and a second guide part for guiding the movement of the second lens so that the second lens is moved to each of the zoom positions during zooming and remains stationary during automatic focusing, wherein the lens movement guide member is rotated to move the first and second lenses; and
   an actuator providing driving power necessary to move the first and second lenses during zooming and automatic focusing,
   whereby both the first and second lenses are moved during zooming, and subsequently, only the first lens is finely moved during automatic focusing so that automatic focusing is performed by the single actuator.

8. The lens driving device according to claim 7, wherein the movement guide member comprises a lens barrel rotated by the actuator,
   the first guide part and the second guide part each comprise a guide slot perforated on an outer circumference of the lens barrel, and
   the first and second lenses are moved along the guide slot.

9. The lens driving device according to claim 8, wherein the second guide part comprises a guide slope for guiding the movement of the second lens to each of the zoom positions, and a movement restraint formed on a plane perpendicular to a rotational axis of the movement guide member to restrain the movement of the second lens from each of the zoom positions during automatic focusing.

10. The lens driving device according to claim 7, further comprising an optical axis guide part for guiding the movement of the first and second lenses so that the first and second lenses are moved along the optical axis.

* * * * *